United States Patent
Theroux et al.

(10) Patent No.: US 7,992,133 B1
(45) Date of Patent: Aug. 2, 2011

(54) TECHNIQUES FOR DEBUGGING DISTRIBUTED APPLICATIONS

(75) Inventors: Michael E. Theroux, New Ipswich, NH (US); William J. Collins, Harwich, MA (US); Gavin Thomas Nicol, Barrington, RI (US); Charles A. Nuzzolo, Jr., Andover, MA (US); Donald E. Stinchfield, North Scituate, RI (US); William M. Cullen, Cambridge, MA (US)

(73) Assignee: Progress Software Corporation, Bedford, MA (US)

( * ) Notice: Subject to any disclaimer, the term of this patent is extended or adjusted under 35 U.S.C. 154(b) by 1294 days.

(21) Appl. No.: 11/560,760

(22) Filed: Nov. 16, 2006

Related U.S. Application Data

(60) Provisional application No. 60/773,576, filed on Feb. 14, 2006.

(51) Int. Cl.
*G06F 9/44* (2006.01)
(52) U.S. Cl. ........ 717/124; 717/103; 717/127; 717/129; 717/133; 714/38.1; 709/201
(58) Field of Classification Search .................. None
See application file for complete search history.

(56) References Cited

U.S. PATENT DOCUMENTS

| | | | | |
|---|---|---|---|---|
| 5,781,778 A * | 7/1998 | Meier et al. | ........... | 717/127 |
| 5,794,047 A * | 8/1998 | Meier | ........... | 717/133 |
| 5,970,248 A * | 10/1999 | Meier | ........... | 717/125 |
| 6,058,393 A * | 5/2000 | Meier et al. | ........... | 707/999.01 |
| 6,324,683 B1 * | 11/2001 | Fuh et al. | ........... | 717/124 |
| 6,470,388 B1 * | 10/2002 | Niemi et al. | ........... | 709/224 |
| 7,203,926 B2 * | 4/2007 | Bogle et al. | ........... | 717/124 |
| 7,293,256 B2 * | 11/2007 | Crawford | ........... | 717/124 |
| 7,765,526 B2 * | 7/2010 | Chen et al. | ........... | 717/124 |
| 7,849,445 B2 * | 12/2010 | Tran | ........... | 717/124 |
| 2001/0005852 A1 * | 6/2001 | Bogle et al. | ........... | 709/102 |
| 2002/0083318 A1 * | 6/2002 | Larose | ........... | 713/164 |
| 2002/0104071 A1 * | 8/2002 | Charisius et al. | ........... | 717/109 |
| 2003/0105644 A1 * | 6/2003 | Ali et al. | ........... | 705/1 |
| 2005/0071243 A1 * | 3/2005 | Somasekaran et al. | ........... | 705/26 |
| 2007/0079292 A1 * | 4/2007 | Chen et al. | ........... | 717/127 |

OTHER PUBLICATIONS

Title: Limiting the probe effect in debugging concurrent object-oriented programs, author: Ilene Seelemann, dated: Nov. 1995, source: ACM.*

\* cited by examiner

*Primary Examiner* — Chameli C Das
(74) *Attorney, Agent, or Firm* — Wilmer Cutler Pickering Hale and Dorr LLP

(57) ABSTRACT

Techniques are disclosed for debugging heterogeneous applications in a distributed environment. In one embodiment, an architecture for debugging heterogeneous applications in a distributed environment is configured to enable both location transparency and dynamic exposure of service state. Regardless of where the physical application state resides, the architecture describes or otherwise provides a mechanism that allows seamless debugging and troubleshooting of distributed applications. The location of the state is transparent to the debugger and the application being debugged. In addition, the architecture enables an individual service to expose its state dynamically at run-time. It is possible for the service to expose its state in a self-describing fashion, allowing service state to be exposed in the architecture regardless of the service environment. The architecture allows for all the capabilities of debuggers running in non-distributed, homogeneous environments in a distributed heterogeneous environment.

26 Claims, 15 Drawing Sheets

TECHNIQUES FOR DEBUGGING DISTRIBUTED APPLICATIONS

RELATED APPLICATIONS

This application claims the benefit of U.S. Provisional Application No. 60/773,576, filed Feb. 14, 2006, titled "Event Driven Architecture For Distributed Applications," which is herein incorporated in its entirety by reference.

FIELD OF THE INVENTION

The invention relates to application development, and more particularly, to debugging applications that dynamically span many environments.

BACKGROUND OF THE INVENTION

In today's world of Service Oriented Architecture (SOA) and Enterprise Service Bus (ESB) implementations, it is possible for users to define high level constructs (like a business process) that utilize many individual services. Using these constructs, many different services can be integrated into a single cohesive unit. The heterogeneous services in this unit may be located on the same computer system, or potentially span multiple computer systems globally. In addition, whether the distribution of these constructs is on a single computer system, or multiple, may not be determined until the constructs are used at runtime.

For example, a business process typically consists of one or more steps, where a step describes an individual service or activity to be utilized in the business process. A step can be many things, such as an interface into a Customer Information Control System (CICS), an XML transformation, or a call to a Web Service. The potential capabilities and functionality of a business process step is virtually limitless. Interdependencies between steps can be defined via transitions. Transitions indicate the flow between steps in a business process.

The business process, in turn, may keep its own state. An individual step, or transitions between steps, can manipulate the business process state. The business process state is utilized to share information between steps and transitions in the business process. The business process in effect combines many services and activities into one homogenous application that is accessible via a single interface to business partners.

In SOA and ESB environments, the distributed application can be driven by many different technologies that control the flow of execution between services. These technologies include, but are not limited to, the Business Process Execution Language (BPEL), a Sonic Enterprise Service Bus Itinerary, a Sonic Orchestration Server™ Business Process, a UML Activity diagram, or ebXML.

The development of distributed applications for business activities poses new challenges to developers of such activities. In distributed environments the location of application state can vary dynamically. The state can also be located in many places simultaneously. Most current debugging methodologies in this environment require the use of primitive tracing capabilities. However, in homogeneous environments where information is located in static locations, full-featured debuggers exist. In such full-featured debugging environments, it is common place to be able to view and manipulate application state anywhere within the application. In addition, it is also common for debuggers to be able to dynamically set breakpoints, pause, and resume application while running within the debugging environment.

However, in a heterogeneous distributed environment, it is often impractical to determine the physical location of application state. Often, this information is not known to the distributed application until the distributed application is in use. In addition, the location of application state may itself be distributed dynamically over time. In other words, when executing a distributed application, it is possible for the application state to reside on different physical systems when the application is run at time 't' vs. at time 't+1'. In such a scenario, it is extremely difficult to troubleshoot errors in the distributed application.

The issue is further complicated by the fact that the state and debugging features need to be available in individual services. The features and state available in individual services can vary greatly and need to be exposed to the debugger. For instance, a service that exposes a database may wish to expose debugging capabilities to single-step and monitor a series of SQL statements. A service that exposes a BPEL execution engine may wish to expose BPEL constructs. Errors in such an environment could reside in the shared state of the distributed application, in the state of an individual service. An additional complication occurs because in typical SOA deployments, state can reside anywhere in the world. Troubleshooting and debugging a distributed worldwide application is extremely difficult. It is difficult because the location of application state varies dynamically. It is also difficult because the type of data that requires troubleshooting and debugging varies from service to service.

What is needed, therefore, are techniques for debugging heterogeneous applications in a distributed environment.

SUMMARY OF THE INVENTION

One embodiment of the present invention provides a method for debugging distributed applications for a given scenario. The method includes exposing (by a Run Context) state of a distributed application and/or services making-up that distributed application, the Run Context including an Application Programming Interface (API) that allows the services to interact during debug, and coordinating (by a Debug Context) the distributed application and presenting a unified view of the distributed application to a debugger, wherein the Debug Context is a centralized repository. The distributed application utilizes the Run Context to interact with the Debug Context. In one such case, the Run Context can be copied and destroyed during execution of the distributed application, thereby allowing the Run Context to propagate wherever the distributed application resides, regardless of how and when the distributed application decides to distribute itself. In another such case, the Run Context further includes knowledge on how to contact the debugger. In another such case, the Run Context flows with the distributed application. Here, the method may include triggering (by the Run Context) a callback into the Debug Context, thereby modifying state of the Debug Context. When the Run Context triggers a callback, the method may further include waiting (by the Run Context) for a response from the debugger utilizing the Debug Context. In one such case, while waiting for a response, the Run Context blocks at least part of the distributed application until the debugger allows that at least part of the distributed application to resume. The callback may include, for example, distributed application state and/or service state. In one such case, the distributed application state and/or service state is modified by the debugger using the Debug Context before a response is sent from the debugger. In another such case, the debugger can modify at least one of distributed application state and service state dynamically during debug. The method may include executing one or more debugging capabilities, including any one or more of providing breakpoints, suspending/resuming, single-stepping across heterogeneous service environments, and modifying distributed application and/or service state dynamically while debugging. In another particular case, the Run Context is associated with a stack of locations. In one such case, the method includes accessing the stack to carryout a single-stepping process. In another particular case, the Run Context is associated with a tracking ID that allows the debugger to detect when multiple branches of execution occur.

Another embodiment of the present invention provides one or more machine-readable mediums (e.g., one or more compact disks, diskettes, servers, memory sticks, or hard drives) encoded with instructions, that when executed by one or more processors, cause the processor to carry out a process for debugging distributed applications for a given scenario. This process can be, for example, similar to or a variation of the previously described method.

Another embodiment of the present invention provides a system for debugging distributed applications for a given scenario. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the debugging functionality described herein), or some combination thereof.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1A:
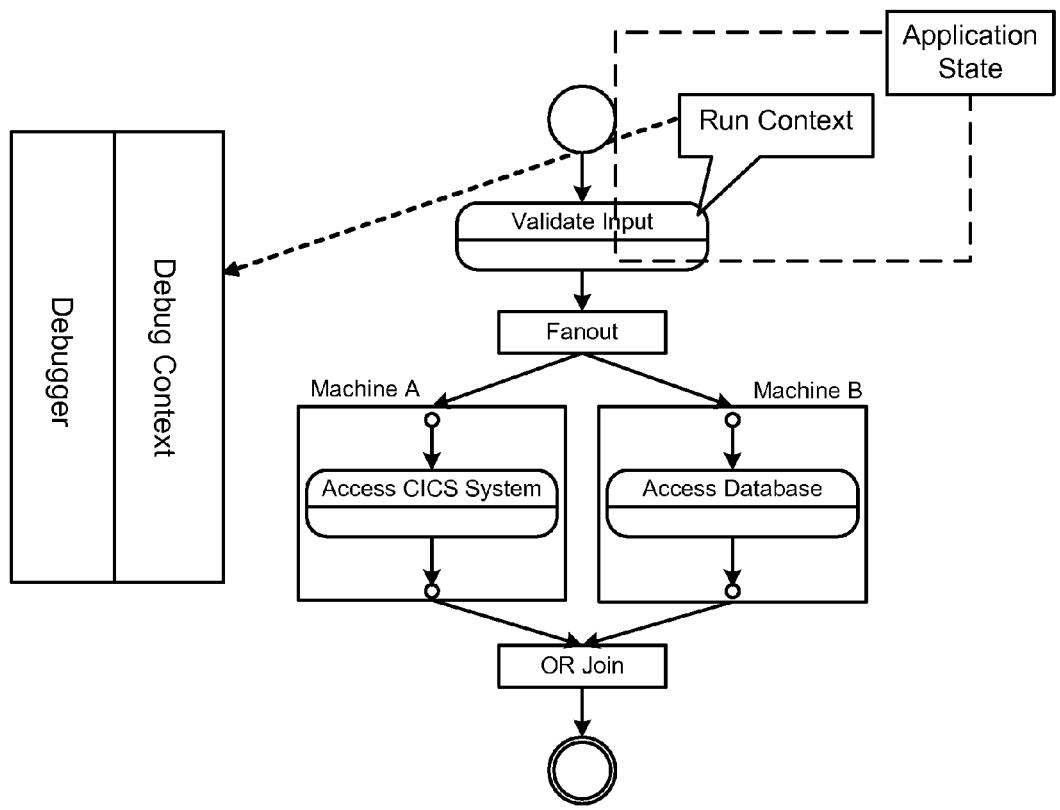
FIGS. 1a and 1b illustrate seamless monitoring and debugging across distributed and heterogeneous application environments, in accordance with an embodiment of the present invention.

Architecture and techniques are disclosed for debugging heterogeneous applications in a distributed environment.

General Overview

In one embodiment of the present invention, an architecture for debugging heterogeneous applications in a distributed environment is configured to enable both location transparency and dynamic exposure of service state. Regardless of where the physical application state resides, the architecture describes or otherwise provides a mechanism that allows seamless debugging and troubleshooting of distributed applications. The location of the state is transparent to the debugger and the application being debugged. In addition, the architecture enables an individual service to expose its state dynamically at run-time. It is possible for the service to expose its state in a self-describing fashion, allowing service state to be exposed in the architecture regardless of the service environment. The architecture allows for all the capabilities of debuggers running in non-distributed, homogeneous environments in a distributed heterogeneous environment.

In one particular embodiment, the architecture has features including Run Context, Run Context Lifecycle, and Debug Context. The Run Context (sometimes referred to as "Test Context" herein) has the following attributes: it includes knowledge on how to contact the debugger; it provides an Application Programming Interface (API) to allow the distributed application as a whole, as well as the individual services making-up the distributed application, to interact within the debugging environment; and it provides the capabilities to expose state of both the distributed application (as a whole) as well the individual services. Note that a distributed application can be implemented as one or more services.

With respect to the Run Context Lifecycle, the Run Context can be copied and destroyed during the execution of the distributed application, allowing fully concurrent application execution to be fairly represented in the debugger. This allows the Run Context to propagate wherever the distributed application resides, regardless of how and when the application decides to distribute itself. The Debug Context (sometimes referred to as "Test Object" herein) can be implemented, for example, as a centralized repository that coordinates the distributed application and presents a unified view of the application to a debugger.

In this particular embodiment, the distributed application utilizes the Run Context to interact with the Debug Context. The Run Context is propagated wherever the distributed application resides, allowing the overall architecture to be as distributed and dynamic as the application itself. The Run Context, as it flows with the application, triggers callbacks into the centralized Debug Context, thereby generating an event to be managed by the Debug Context and to be presented to the Run Tool. This event generation effectively modifies the state of the Debug Context (e.g., by adding the event into a queue structure of the Debug Context, or other such event modification, as will be apparent in light of this disclosure).

The Run Context, when it triggers a callback, waits for a response from the debugger utilizing the Debug Context. While waiting for a response, the Run Context blocks part (e.g., a subset of one or more services making up the application) or all of the distributed application until the debugger allows the distributed application (or one or more services making up that application) to resume. In addition, the callback can include overall application state and/or service state. This state can be modified by a debugger using the Debug Context before a response is sent from the debugger. In one such embodiment, this is accomplished using a Remote Procedure Call (RPC) technology or any other suitable technique that would allow application and/or service state to be updated. This allows the debugger to modify application and/or service state dynamically while the application or service is being debugged.

Figure 1B:
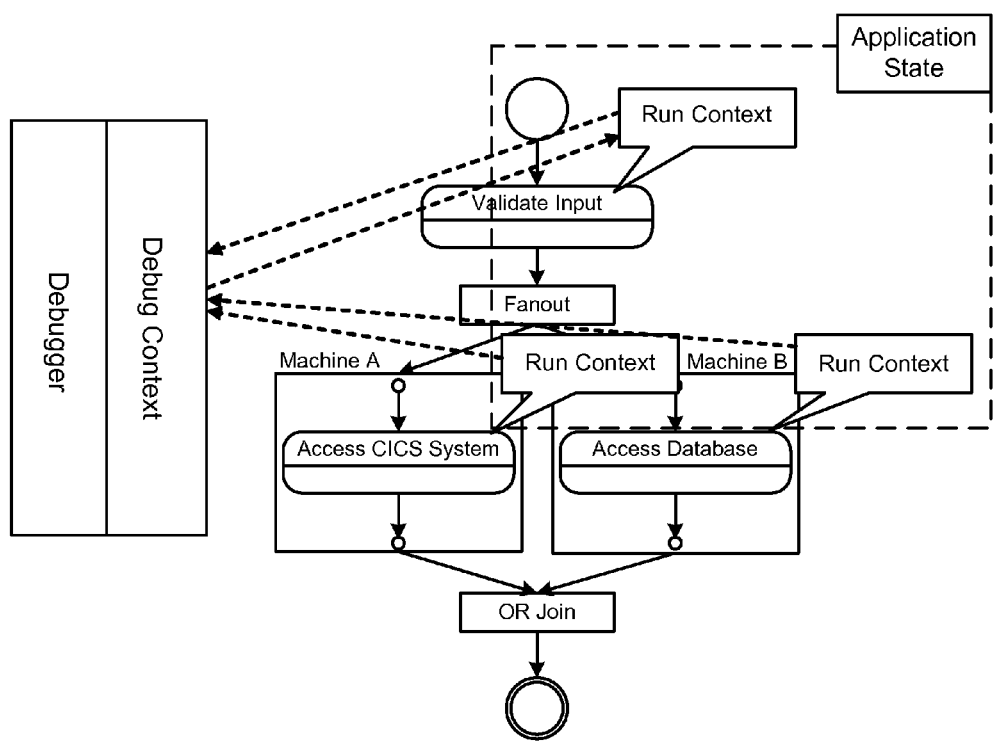

Consider the example shown in FIG. 1a, which is a simple business process. The business process is executed, and the first service in the process validates the input. At the "Validate Input" service, the Run Context is utilized to access the Debug Context. The Validate Input service exposes its state, and the debugger can manipulate this state of the Validate Input service. When the debugger sends the response to the Run Context, the business process can decide to concurrently access the CICS and Database system concurrently on two different computers (machines A and B). The Run Context, which is flowing with the state of the business process, is copied and sent with the business process state to those two systems, as shown in FIG. 1b. Note the machines A and B can be different. For example, machine A can be an IBM® mainframe and machine B can be a Sun Microsystems® server. By using the Debug Context, the debugger is isolated from the dynamic nature of the distributed application. By using the Run Context, the distributed application is also isolated from the Debug Context and the debugger. This makes the entire system completely location transparent and dynamic.

The combination of the blocking behavior and the capability to modify application and service state allows the provision of a full range of debugging capabilities. As will be apparent in light of this disclosure, such capabilities include providing breakpoints, suspending/resuming capabilities, single-stepping across heterogeneous service environments, and modifying application/service state dynamically while debugging.

Thus, by employing techniques described herein, it is now possible to enable full-featured debugging across distributed and heterogeneous application environments. With minimal effort, it is possible for any application to be debugged, regardless if the application is a legacy mainframe system, or the newest application server environment. The techniques allow users to monitor and debug their ESB and SOA environment seamlessly.

System Architecture

Figure 2A:
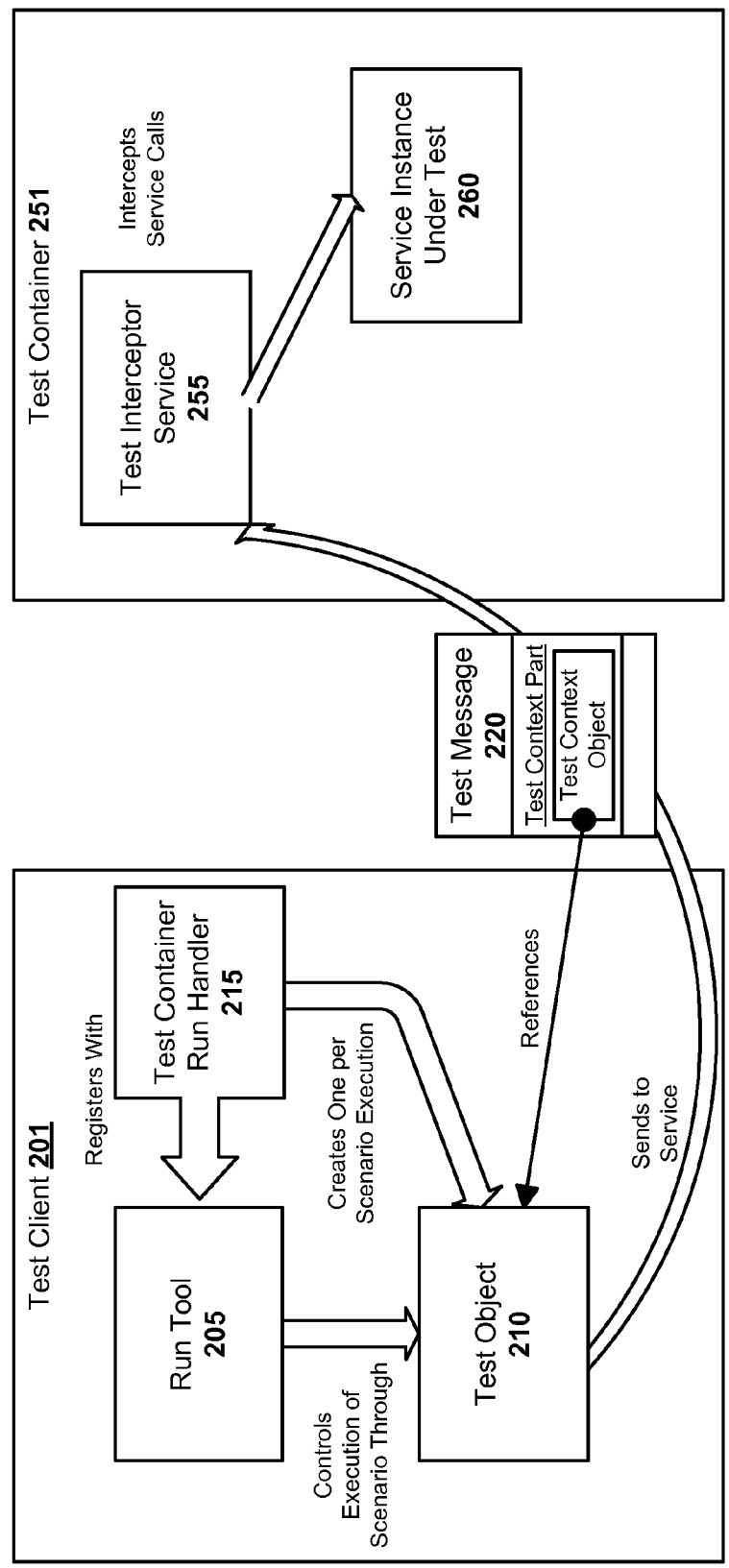
FIGS. 2a and 2b illustrate architecture of a Test Framework for debugging heterogeneous applications in a distributed environment, in accordance with an embodiment of the present invention.
Figure 2B:
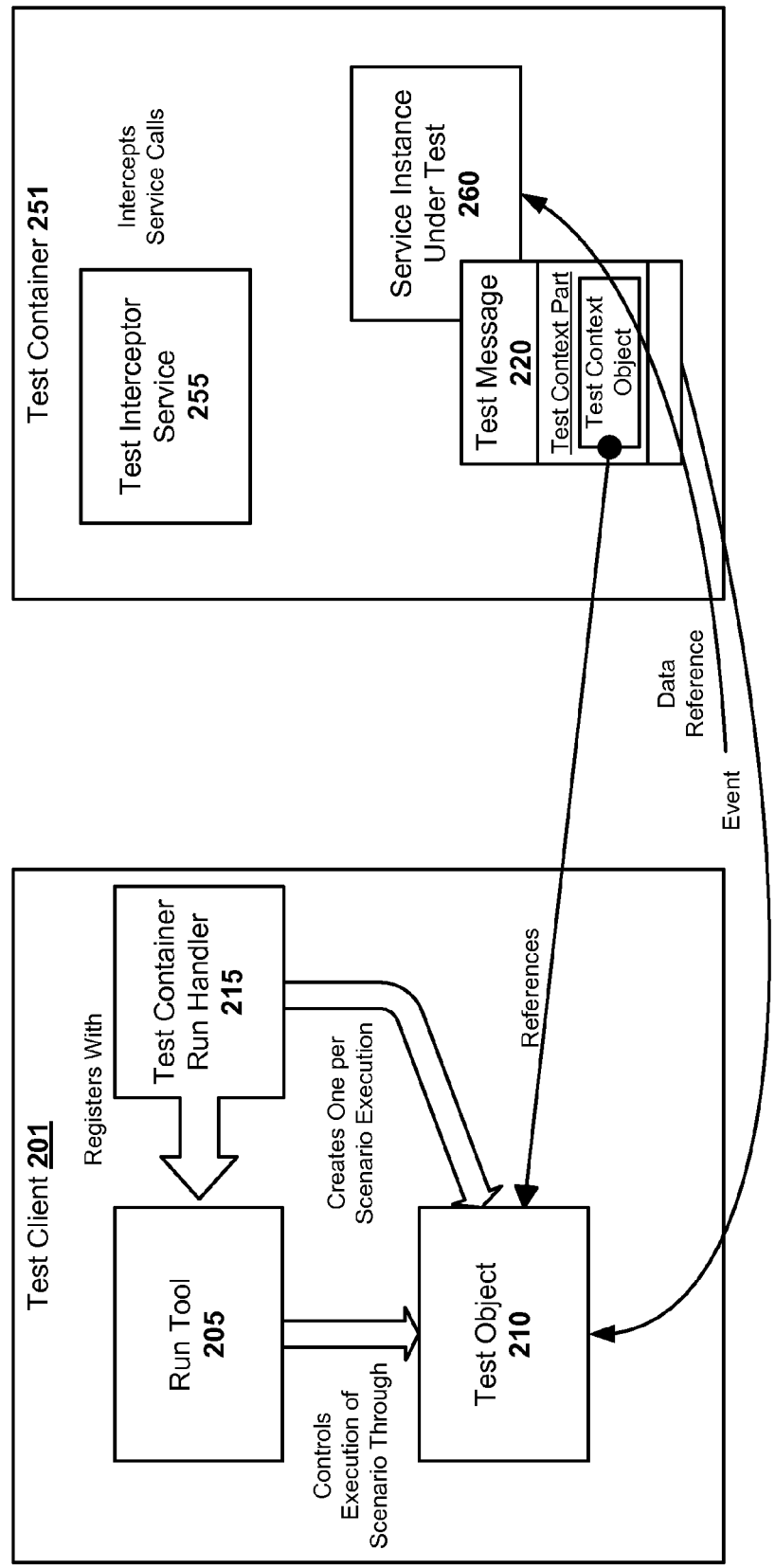

FIGS. 2a and 2b illustrate architecture of a Test Framework (also referred to as the "Run Framework" herein) for debugging heterogeneous applications in a distributed environment, in accordance with an embodiment of the present invention. This architecture can be used, for example, for the execution and debug of an SOA service instances or business processes, although other applications and architecture variations will be apparent in light of this disclosure.

In general, the Test Framework includes API and communications technology necessary to debug any given application that utilizes a given communication backbone. The Test Framework of this example embodiment provides a number of debugger capabilities, such as Single stepping (step-out/step-in/step-next), the capability to pause and resume a running test, and breakpoints. The Test Framework also provides the ability for applications to export their application state in a way that allows debuggers to modify their state at debug time. The Test Framework may also be capable of both "running" and "debugging." Note that a "Run" can be thought of as a "Debug" without breakpoints.

As can be seen, the architecture of the Test Framework includes a set of client-side components residing in a Test Client 201, a set of server-side components residing in a Test Container 251, and Test Messages 220 that flow through the services of the Test Container 251. The Test Client 201 includes a Run Tool 205, a Test Container Run Handler (TCRH) 215, and one or more instances of Test Objects (TO) 210. The Test Client 201 can be implemented, for example, as a plug-in (e.g., Eclipse) or other suitable executable. The Test Container 251 (e.g., which can be implemented as an ESB Service Container) includes one or more running Service Instances under Test (SIT) 260 and their associated Test Interceptor Services (TIS) 255. A Test Context Object (TCO) is associated with a single instance of a Test Object 210 in the Test Client 201, and is embedded in a Test Context part of Test Messages 220 that flow through the services of the Test Container 251. These Test Context Objects follow the flow of message processing.

The Test Interceptor Service 255 is a hidden component that acts as an intermediary between the debugger and the SIT 260 being debugged. Configuration of Test Interceptor Service 255 can be performed outside of the Test Framework (e.g., such as at installation time). In one particular embodiment, Test Interceptor Service 255 is created and configured by the Run Tool 205 that enables the TCRH 215 to control and sequence the execution of a SIT 260, and is programmed (other otherwise configured) to retrieve information from the debugger to create an application request that is valid for a particular artifact. Alternatively, the Test Interceptor Service 255 can be created and configured by other mechanisms, such as at software installation time. The Test Interceptor Service 255 can be implemented utilizing many mechanisms, such as a J2EE servlet filter, a message handler, an Aspect (AspectJ), code in the SIT 260, or any other suitable mechanism. In one particular embodiment, it is implemented as a service that is invoked previous to every SIT 260.

In addition, a particular embodiment may choose to first send the Test Message 220 to an intermediary location for modification and analysis in a manner that is conducive to debugging for that particular SOA/ESB implementation. In one such embodiment, this intermediary location is a service referred to as the Run Service. The Run service can transiently override configuration information allowing information that may be sent out-of-band from the Test Context to be redirected to Test Object 210.

In one particular embodiment, Messages can be sent to Endpoints. Endpoints may be categorized into "exit" (normal message processing locations), "fault" (application level error information), or Rejected Message (system level error information) Endpoints. In one such embodiment, the Run Service is used to change configuration settings such that services redirect messages sent to Endpoints associated with the Test Object 210 for processing by the Run Tool 205, and provide a consistent interface for both out-of-band messages and events.

The Test Interceptor Service 255 is configured to abstract ESB specifics from the client-side of the Test Framework. SIT 260 can be any service instance with an associated Interceptor Service 255 being executed by the Test Framework within the Test Container 251. Alternatively, or in addition, the Test Interceptor Service 255 can be optional if the SIT 260 interacts with the Test Context API directly.

The Test Container Run Handler 215 is an artifact specific object that is utilized to run/debug that specific artifact. From the Test Container Run Handler 215, Test Objects 210 are created. In one particular embodiment, the Test Container Run Handler 215 is registered with the Run Tool 205 and responsible for managing the execution of scenarios for ESB Services in the Test Container 251. In general, the run/debug of any artifact involves first creating a Run Handler 215. The creation of a Run Handler 215 can be carried out, for example, using of a RunHandlerFactory that creates a Run Handler 215 when supplied a type. Specific Run Handlers exist for every type of supported artifact. In one particular case, Run Handlers exist for ESB Web Service (ESBWS) (e.g., Progress® Sonic ESB®), ESB Database (ESBDB) (e.g., Progress® Sonic ESB®), Extensible stylesheet language transformation (XSLT), process, and service invocation. More Run Handlers can be developed as additional artifacts are made runnable/debuggable, as will be apparent in light of this disclosure. Once the Run Handler 215 is created, it can be initialized via an "init( )" function. The init function takes a map of name/value pairs indicating the connection information for the management framework domain that this run will be running on. In accordance with one particular embodiment, parameters names that are used generically by all run handlers include connection and security information to be able to utilize the underlying communication and configuration infrastructure. Note that Run Handler 215 implementations for specific artifact types may define additional Run Handler parameters. Further note that creation of the Run Handler 215 creates a connection to the management framework. RunHandler.destroy( ) (or other suitable function call) can be used to close this connection.

In one particular embodiment, the Test Framework implicitly discovers the location of the Run Service (SIT 260) via the Run Service's instance name. In one such case, this defaults to dev.Run, but can be configured to search for another service name. This discovery occurs when the test is run. The management framework connection established during the creation of the Run Handler 215 can be utilized, for example, to discover this information.

As previously explained, the Test Object 210 is created from a Run Handler 215 using the "createRun( )" function. In general, the Test Object 210 (also referred to as the "Debug Context" herein) is the object used to interact with an artifact being run and debugged. The Test Object 210 is utilized to submit requests for the run (such as run itself, as well as breakpoints, suspend, resume, cancel). Multiple Test Objects 210 can be created from a single Run Handler 215. In accordance with one particular embodiment of the present invention, when a Run is created, a map of name/value pairs is provided (e.g., by operation of the createRun( ) function). This map of names/values will vary depending on the artifact being debugged and additionally controls the behavior of the Run. In the example embodiment shown in FIG. 2a, a Test Object 210 can be created for each scenario execution which maintains the state of that execution and coordinates communication from the Run Tool 205 to the Test Container 251. The Test Object 210 can also be used to manipulate an Event Request Manager. The Event Request Manager is used to add/remove breakpoints, single-step, send messages, etc. In one such case, the Test Object 210 maintains an Event Queue containing an ordered list of Testing Events in the sequence that they occurred in the scenario's execution, and also maintains an object that manages requests by the Run Tool 205 for the Testing Events it wishes to receive. FIG. 2b shows an Event being propagated to the Test Object 210, and a Data Reference being propagated to the SIT 260. The Data Reference, which comes from the Event being communicated back to the Test Object 210, can be used to change the state. Every artifact that can be run independently has their Run implementation, and may require different information in order to properly execute. For instance, a Transformation Run requires an XSLT and input XML document. A process run uses a process name. In one particular embodiment, all implementations of a process run share some common map values.

Consider, for example, a service that has the capability of utilizing Runtime Parameters as now discussed, in accordance with one particular embodiment of the present invention. RUNTIME_PARAMS: When executing a service or business process (e.g., a group of SITs 260), Runtime Parameters can be specified. The Test Framework can provide the capability of specifying Runtime Parameters for a service or process. The RUNTIME_PARAMS value is an XQParameters object that can be created using an XQ Parameters Factory (e.g., by Progress® Sonic ESB®). When the RUNTIME_PARAMS object is specified, the given XQParameters can be utilized as the runtime parameters for the artifact being executed. The Run Tool 205 can be implemented, for example, as an Eclipse plugin (http://www.eclipse.org/). Other example run tools will be apparent in light of this disclosure.

Requests are submitted to the Run Handler 215 via an Event Request Manager. The Event Request Manager is retrievable from the Test Object 210. In general, requests are utilized to request that a run/debug perform a certain action at a specified location within an artifact. Requests include, for example, requests to send a message, set breakpoints, or perform single-steps. In more detail, a request is submitted to the Event Request Manager. From the Event Request Manager, requests can be created, submitted, queried, and removed. Individual artifact implementations may extend Event Request Manager to implement additional requests. In one such particular embodiment, all implementations of Event Request Manager implement the following requests: Breakpoint requests, Send Run message requests (e.g., Progress® Sonic ESB® XQMessages), Receive Response requests (e.g., Progress® Sonic ESB® XQMessages), Receive RME requests (e.g., Progress® Sonic ESB® XQMessages), Receive Fault requests (e.g., Progress® Sonic ESB® XQMessages), Step Next requests, Step Into requests, and Step Out requests. A request is submitted to the request manager at a specified location. When a request is honored by the application (by matching the location) an Event is generated and placed onto an Event queue. The Event Queue is accessible by the Test Object 210 object.

Each of the requests above will generate specific events, as reflected in Table 1, an in accordance with one particular embodiment:

TABLE 1

| | |
|---|---|
| BreakpointRequest | BreakpointEvent |
| SendRunMessageRequest | SendRunMessageEvent |

TABLE 1-continued

| | |
|---|---|
| ReceiveResponseMessageRequest | ReceiveResponseMessageEvent |
| ReceiveRMEMessageRequest | ReceiveRMEMessageEvent |
| ReceiveFaultMessageRequest | ReceiveFaultMessageEvent |
| StepNextRequest | StepEvent |
| StepIntoRequest | StepEvent |
| StepOutRequest | StepEvent |

When an Event is being processed, a function is available to query the state exported by the application being debugged. In this example, this information is retrieved via the Event.get-Data( ) function. Depending on the location in which the event is being generated from, Event.getData( ) will return the information that is available at that location. Typically, the debugger should query the location to determine the type of data being exported. The debugger calls Event.getLocation( ). From that location, the debugger performs a query of the instance type of the returned data (instanceof). The result of the instanceof can be utilized to assume the datatype of Event-.getData( ). For example, if the Location is an instanceof ScriptEngineLocation, and the constant in the ScriptEngine-Location is "EVERYTHING" (e.g., such as the case for Progress® Sonic ESB® ESBDB/ESBWS), then the debugger can assume the data returned to the Run Tool 205 is a IVariablesReference (e.g., by Progress® Sonic ESB®). The debugger would then cast the results of getData( ) to a IVariablesReference. When an Event is generated, the application honoring the request will be blocked. The application remains blocked until Event.resume( ) is called by the debugger. Note that the debugger queries and manipulates the IVariablesReference before Event.resume( ) is called. In the case where the application is exporting information using Exporters (as will be explained in turn), the information retrieved from getData( ) will be stale and inaccessible after Event.resume( ) is called. Further note that it is possible for an Event to be created without an associated request. In addition, in one particular case, requests remain in the Event Request Manager until they are removed via the deleteEventRequest( ) or deleteEventRequests( ).

Locations represent a physical location within an artifact. Locations can be, for instance, a step in a business process (or before a process step, or before a service), or a location in the Variable->Parameter mapping within an ESBWS (e.g. Progress® Sonic ESB®). A Location can also represent a line number in Java code, or in an XSLT. In general, Locations are artifact specific. Locations also exist that can match multiple places in a test. This includes the AnyBeforeProcessLocation, or the "AnyLocation" (e.g., used for single stepping). In one particular embodiment, Locations are created using a LocationFactory that is associated with the specific artifact being run. Locations are utilized when submitting a request for a specific location. Locations are also retrieved from events to determine where an event occurred. The parameters required to create a location varies between Run Handler implementations. In one particular embodiment, all locations implement the function "isSame( )". This function returns True if the two locations are considered the same. A wildcard location (like AnyBeforeProcessLocation, or AnyLocation) is considered the same as a BeforeProcessLocation.

The Test Framework implements an asynchronous API. When a breakpoint event request is triggered (or any request for that matter), an event is asynchronously triggered and processed by the debugger. Typically, when an event is triggered, the application being debugged is paused until Event.resume( ) is called by the debugger. This allows the debugger to access and potentially modify state communicated in the event before allowing the application to continue processing.

The Test Context part of the Test Message 220 represents the API utilized by that application to participate in a run/debug session. The Test Context (also referred to as "Run Context" herein) follows a business process, replicating and propagating wherever necessary. Via the Test Context of Test Message 220, services within ESB can interact with the debugger. In the embodiment shown, the Test Context Object is an object created for each scenario execution which follows the thread of execution of a scenario in the Test Container 251 and coordinates communication from the Test Container 251 to the Run Tool 205.

Applications using the Test Framework can send their state to the debugger via an Event. The exported state maybe a serializable object, but also can be an Exported object. In one particular embodiment, the Test Framework uses Java dynamic proxies. This technology which is used as part of Java reflection allows objects to be exported. In one such case, an exported object is a remote method invocation (RMI) stub that can be sent to JMS clients via a message. When this RMI stub is deserialized and utilized, method calls can be made on the original, unexported object. This allows debuggers to potentially view and modify state in the application itself using remote procedure calls (RPCs). However, by using this pattern in combination with the Test Context, it is possible for Run Tool 205 to manipulate the state of SIT 260 without knowing its physical location. The ability of the distributed application or service to expose its state via an RPC stub (or other suitable mechanism) allows an application to expose a closure of the application to the debugger. The debugger has access to all the state any application or service wishes to expose, and can utilize additional mechanisms to discover that state (such as Java reflection).

In one particular embodiment, the Test Framework gives generic access to properly configured exporters allowing applications to expose virtually any state, and also provides runtime support for the execution and debug of Service and Process Configuration scenarios within an ESB Test Container. In addition, the Test Framework provides run and debug control of the ESB Test container from the Run Tool (e.g., Eclipse Run Tool), and also provides the Run Tool access to remote Service Context data in the Test Container during the execution of ESB Service and Process Configuration scenarios. The client-side and server-side components shown in FIGS. 2a-b will be further discussed with reference to FIGS. 3a-6.

Testing Framework API

In accordance with one particular embodiment of the present invention, the Test Framework API is divided into two separate packages: a package of testing APIs for performing generic testing and a package of testing APIs specific to ESB Service and Process testing. The generic testing API is discussed in detail with reference to FIGS. 2a-b and 3a-c, and the Service and Process Testing API is discussed in detail with reference to FIGS. 2a-b and 4a-f.

Figure 3A:
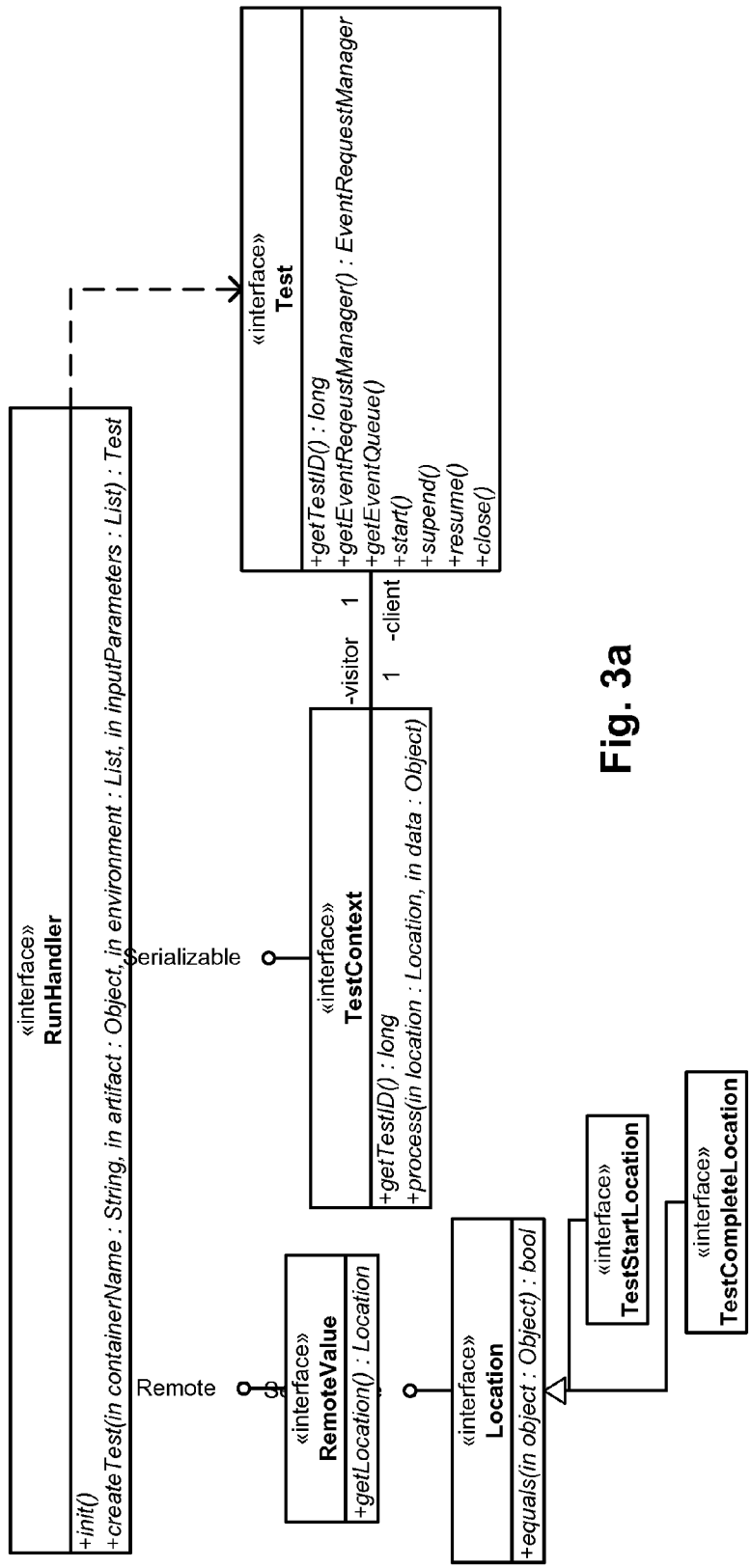
FIG. 3a illustrates a package of testing APIs for performing generic testing in a distributed environment, in accordance with an embodiment of the present invention.

FIG. 3a illustrates a package of testing APIs for performing generic testing in a distributed environment, in accordance with an embodiment of the present invention. The generic Test Framework interfaces includes a Run Handler interface, a Remote Value interface, a Test Context interface, a Test interface, a Location interface, a Test Start Location interface, and a Test Complete Location interface. Each interface will now be discussed in turn.

The Run Handler interface is implemented by all run handlers (including the Test Container Run Handler 215) and enables the Run Tool 205 to create new Test Objects 210 for execution of a scenario. In the TCRH 215, the createTest function of the Run Handler interface initializes and launches a Test Container 251 in preparation for a scenario execution.

The test interface is implemented by a Test Object 210 and provides processes to initiate, monitor, and control the execution of a scenario. A Test Object 210 is uniquely identified by its Test ID property whose value is a GUID guaranteeing that no two Test Objects have the same Test ID. As will be appreciated in light of this disclosure, any number of unique ID schemes can be used here (e.g., random ID generators and hashing functions). In one particular embodiment, the execution of a scenario is initiated by invoking the Test Object's 210 start function, and its execution can be suspended and resumed by invoking the suspend and resume functions respectively. The asynchronous execution of a scenario can be controlled by submitting requests to the Event Request Manager of the Test Object 210. The execution of a scenario can be monitored by consuming events from the Event Queue of the Test Object 210.

The Test Context interface of this example is implemented by a Test Context Object (which is included in the Test Context part of Test Message 220) and provides a process function to trigger the execution of requests based on the location of the Test Context Object. A Test Context Object is associated with a single Test Object 210 which is identified by its Test ID property, in accordance with one particular embodiment. A Test Context Object provides a mobile code platform that follows the thread of execution of a scenario through the Test Container 251 and facilitates the communication between the Test Container 251 and the Test Client 201.

The Location interface of this example is implemented by a Location Object which designates a logical location in the execution of a scenario such as the beginning (TestStartLocation) or end (TestCompleteLocation) of a test, or a physical location such as before the invocation of a service process of a Service Instance (e.g., ServiceLocation). Two Location Objects can be compared for equality which only returns True if they both represent the same location. The Remote Value interface can be implemented, for example, by a Remote Object (e.g., java.rmi.Remote) and has an associated Location. Remote Value Objects provide the Test Client 201 with access to data in the Test Container 251.

Figure 3B:
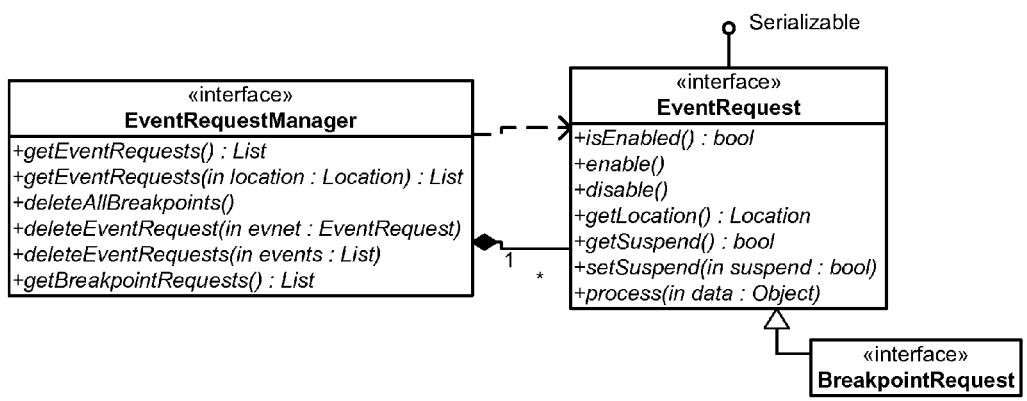
FIG. 3b illustrates an event request framework for use with the testing APIs of FIG. 3a, in accordance with an embodiment of the present invention.

FIG. 3b illustrates an event request framework for use with the testing APIs of FIG. 3a, in accordance with an embodiment of the present invention. In this example configuration, the Event Request Manager interface is implemented by the Event Request Manager of a Test Object 210, and provides a function for creating, accessing, and deleting requests that control the asynchronous execution of the scenario. The Event Request interface is implemented by a Request Object, and provides functions for enabling and disabling the execution of the request. In one particular embodiment, a Request Object is always associated with a location as indicated by its Location property and its process function is executed when the Test Context Object of the Test Message 220 arrives at that location. An event associated with the request is placed on the Event Queue of the Test Object 210 each time the Request Object is executed. If the Suspend property of the Request Object is set True, the execution of the scenario is suspended when the request is executed.

Figure 3C:
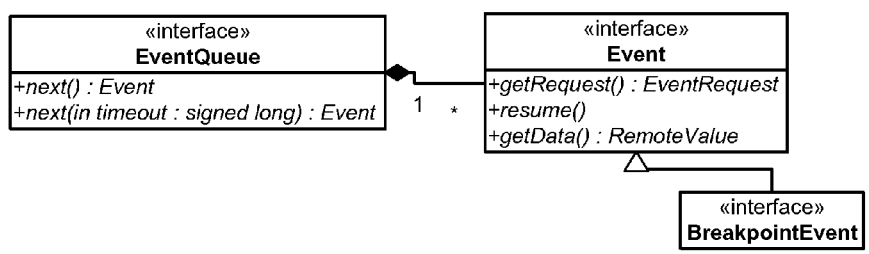
FIG. 3c illustrates an event framework for use with the testing APIs of FIG. 3a, in accordance with an embodiment of the present invention.

FIG. 3c illustrates an event framework for use with the testing APIs of FIG. 3a, in accordance with an embodiment of the present invention. In this example, the Event Queue interface is implemented by the Event Queue of a Test Object 210, and provides methods to consume testing events in the order they occur in the execution of the scenario. In one particular embodiment, the Event interface is implemented by all Event Objects and provides functions for accessing the request and remote data associated with the event. If the execution of the request associated with the event caused the thread of execution of the scenario to suspend in the Test Container 251, invoking the resume function will resume this thread of execution, in accordance with one particular embodiment.

Figure 4A:
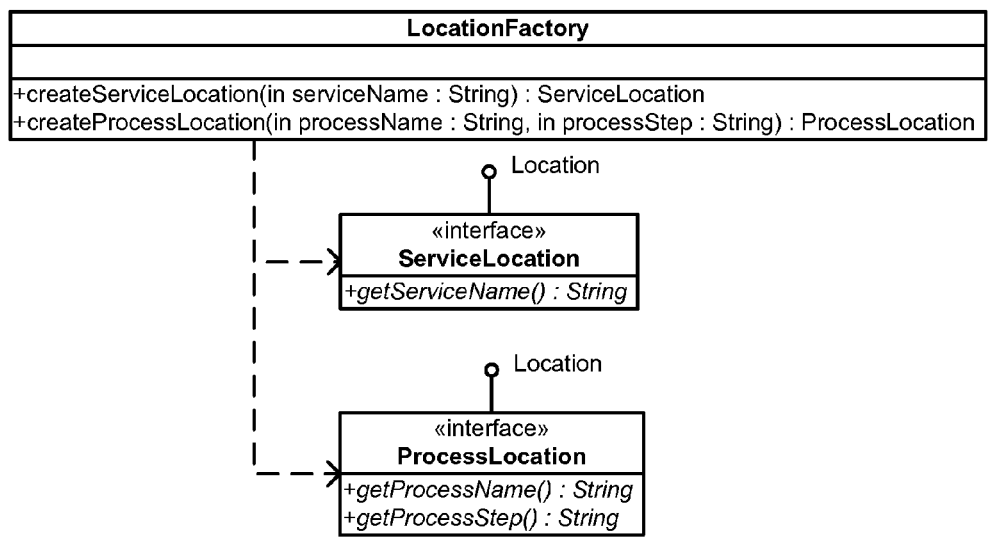
FIGS. 4a, 4b, and 4c illustrate a package of testing APIs for ESB Service and Process testing in a distributed environment, in accordance with an embodiment of the present invention.
Figures 4B, 4C:
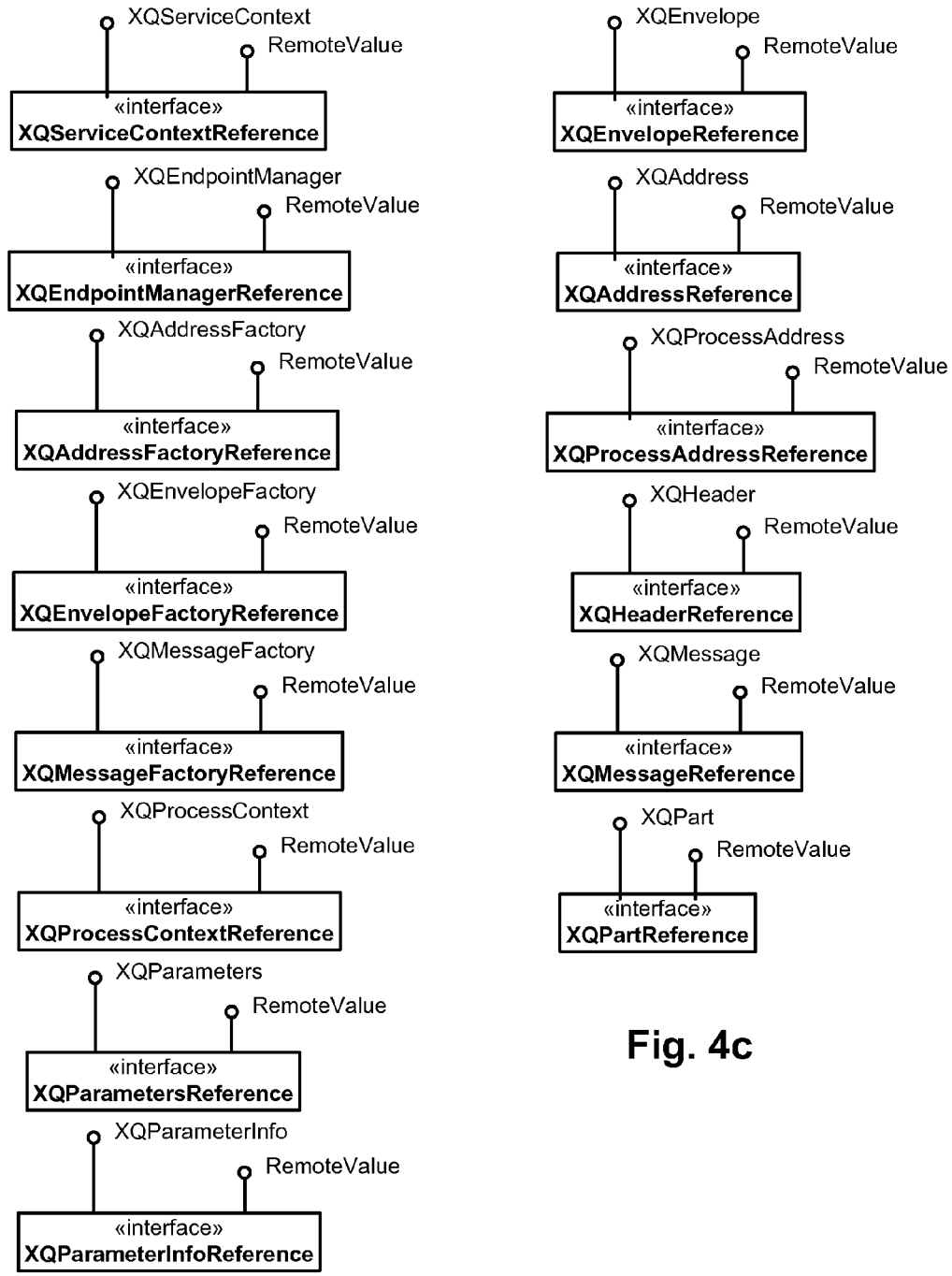

FIGS. 4a, 4b, and 4c illustrate a package of testing APIs for Service and Business Process testing in a distributed environment, in accordance with an embodiment of the present invention. The Service and Process Test Framework of this example configuration includes a Location Factory class, a Service Location interface, a Process Location interface, and an XQ Service Context Reference interface and related Remote Value interfaces.

The Location Factory class provides static functions to create Service and Process specific locations. The Service Location interface is implemented, for example, by a Service Location Object, and designates a specific service in the Test Container 251. The object's Service Name property returns the name of the designated service instance. The Process Location interface is implemented by a Process Location Object and designates a specific step in a process in the Test Container 251. The object's Process Name and Process Step properties return the process and step name in the designated process step. The XQ Service Context Reference interface and related Remote Value interfaces can be implemented, for example, by remote objects which provide the Test Client 201 with access to a Service Context in the Test Container 251. The related Remote Value interfaces shown in FIGS. 4b and 4c include the XQ Endpoint Manager Reference interface, XQ Address Factory Reference interface, XQ Envelope Factory Reference interface, XQ Message Factory Reference interface, XQ Process Context Reference interface, XQ Parameters Reference interface, XQ Parameter Info Reference interface, XQ Envelope Reference interface, XQ Address Reference interface, XQ Process Address Reference interface, XQ Header Reference interface, XQ Message Reference interface, and XQ Part Reference interface.

Figure 4D:
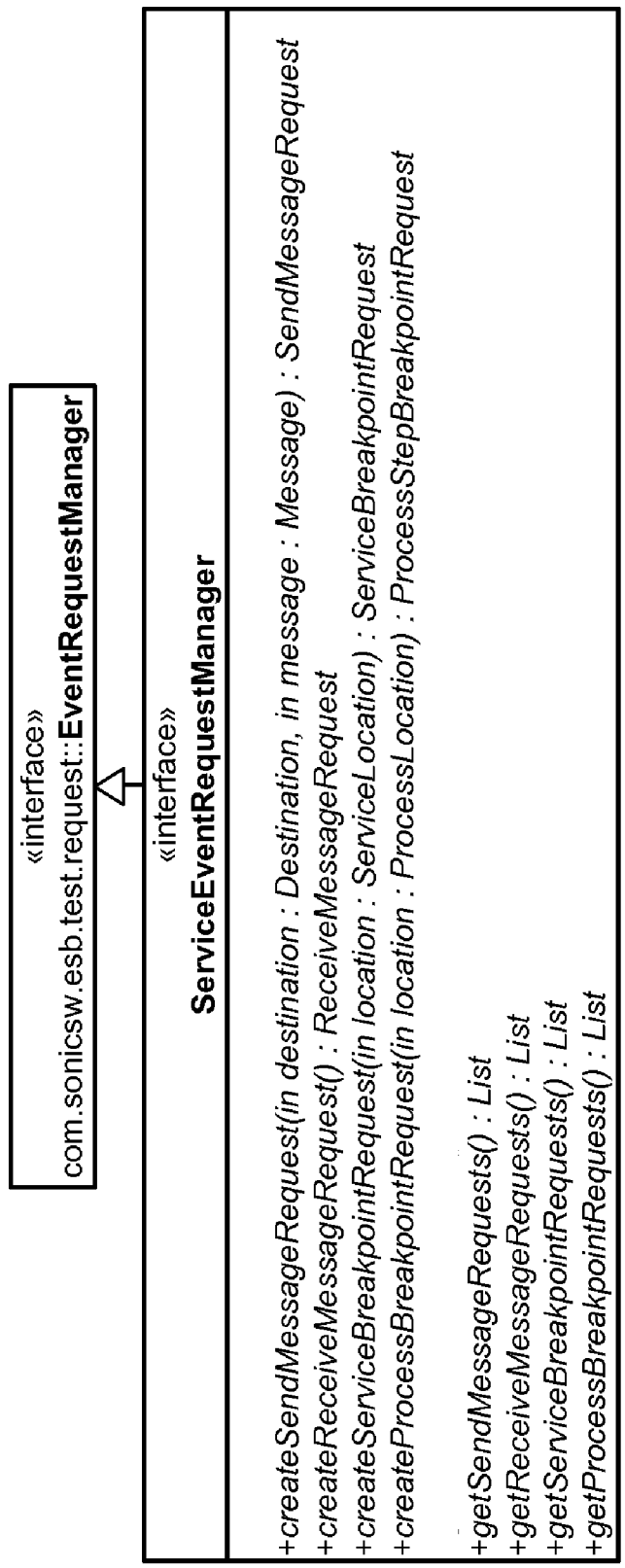
FIGS. 4d and 4e illustrate an ESB Service and Process request framework for use with the testing APIs of FIGS. 4a, 4b, and 4c, in accordance with an embodiment of the present invention.
Figure 4E:
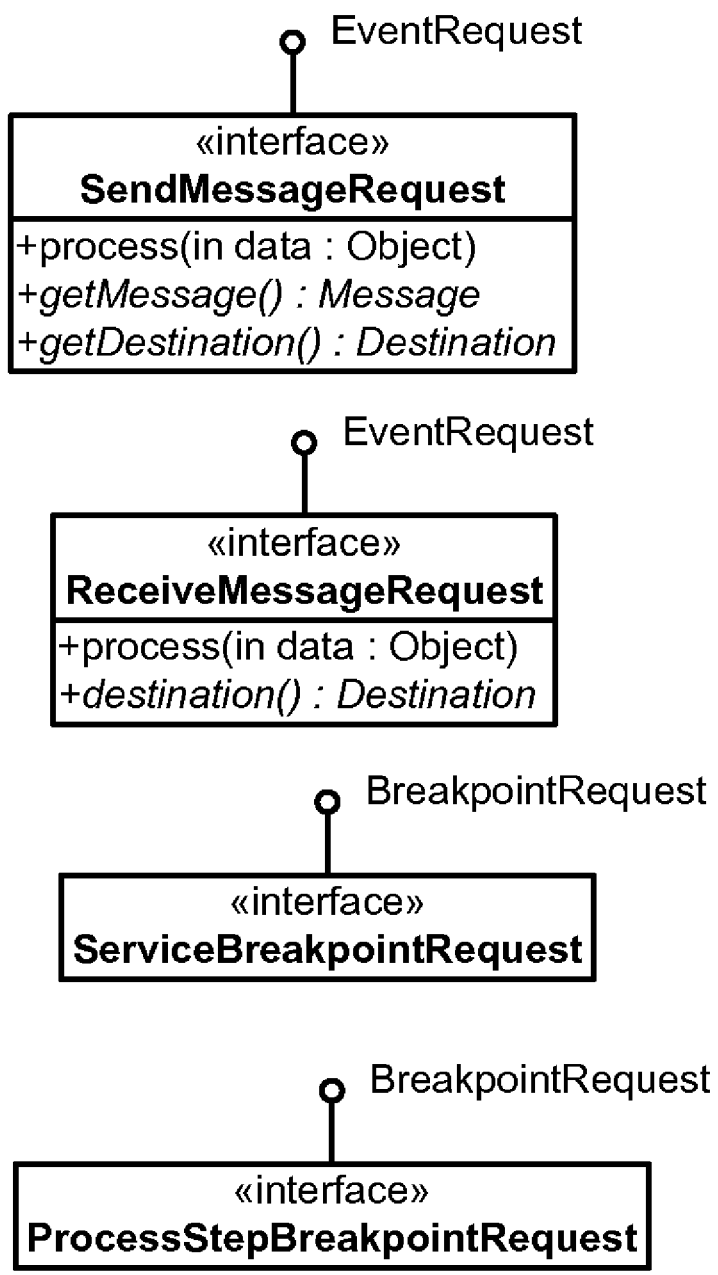

FIGS. 4d and 4e illustrate an ESB Service and Process request framework for use with the testing APIs of FIGS. 4a, 4b, and 4c, in accordance with an embodiment of the present invention. In this particular example, the Service Event Request Manager interface is implemented by the Event Request Manager of a Test Object 210, and provides extended functions for creating and accessing Service and Process specific requests. The Send Message Request interface is implemented by a Send Message Request Object, and requests that the message referenced by its Message property be sent to the destination referenced by its Destination property. Note that a Send Message Request is always created with a Test Start Location, in accordance with one particular embodiment. The Receive Message Request interface is implemented by a Receive Message Request Object, and requests that the Test Object 210 create Message Listeners that consume Messages from the destination designated by its Destination property. The Service Breakpoint Request interface is implemented by a Service Breakpoint Request Object, and requests that the Test Context Object of Test Message 220 suspend operation of the scenario when it reaches the service location designated by its Location property. The Process Step Breakpoint Request interface is implemented by a Process Step Breakpoint Request Object, and requests that the Test Context Object of Test Message 220 suspend operation of the scenario when it reaches the service location designated by its Location property.

Figure 4F:
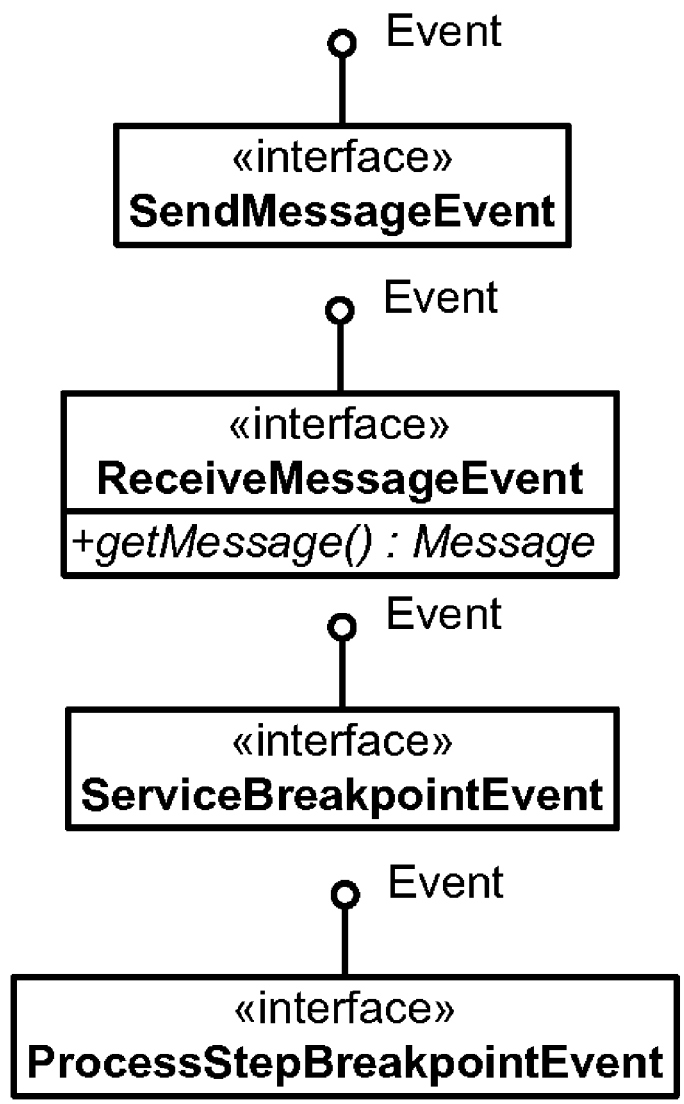
FIG. 4f illustrates an ESB Service and Process event framework for use with the testing APIs of FIGS. 4a, 4b, and 4c, in accordance with an embodiment of the present invention.

FIG. 4f illustrates an ESB Service and Process event framework for use with the testing APIs of FIGS. 4a, 4b, and 4c, in accordance with an embodiment of the present invention. The Send Message Event interface is implemented by a Send Message Event Object, and occurs when its associated Send Message Request Object is executed. The Receive Message Event interface is implemented by a Receive Message Event Object, and occurs when its associated Receive Message Request Object is executed. Its Message property returns the message received. The Service Breakpoint Event interface is implemented by a Service Breakpoint Event Object, and occurs when its associated Service Breakpoint Request Object is executed. The Process Step Breakpoint Event interface is implemented by a Process Step Breakpoint Event Object, and occurs when its associated Process Step Breakpoint Request Object is executed.

Client-Side Execution of Test Scenario

Figure 5:
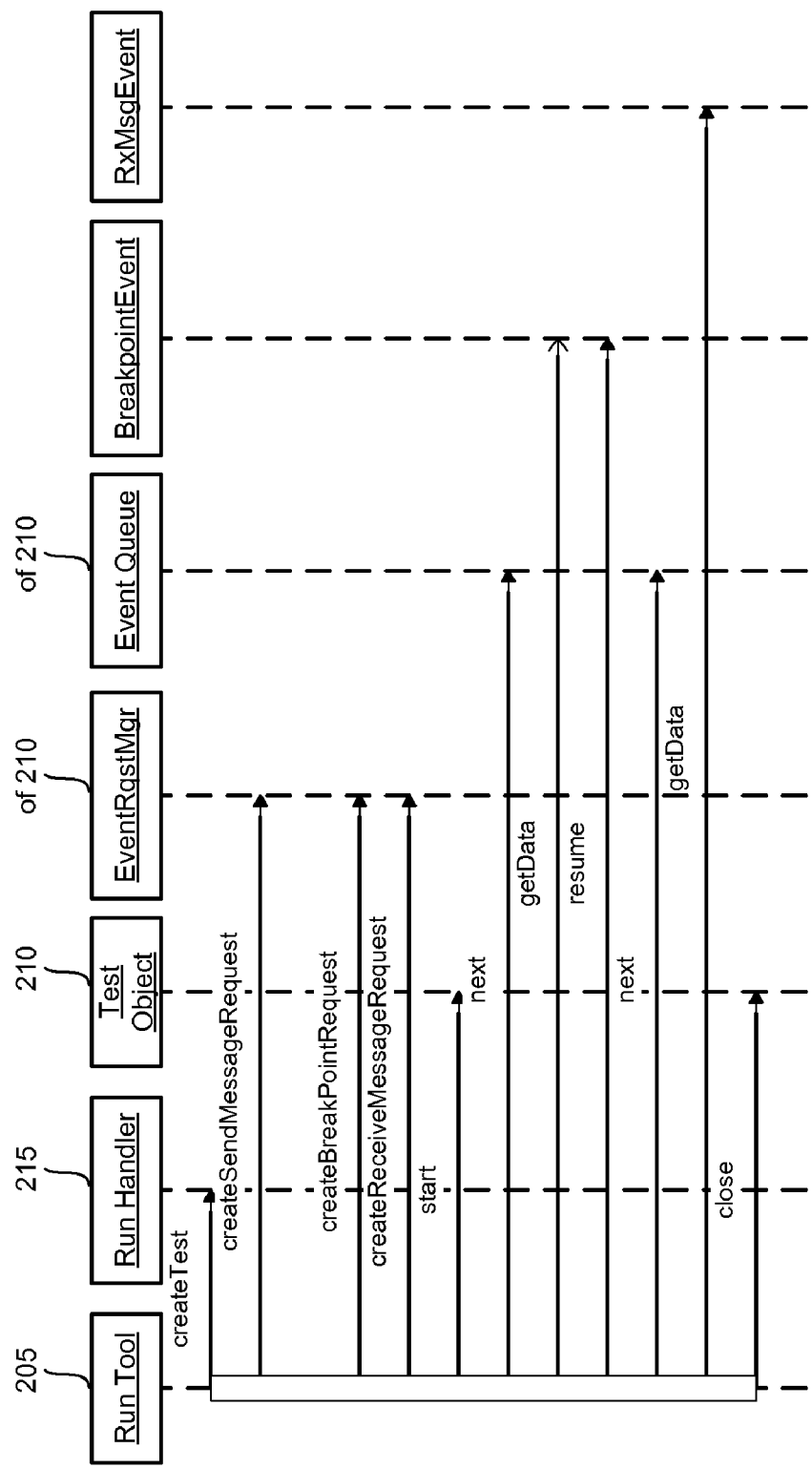
FIG. 5 is a diagram describing the collaboration and sequence of events between test framework components on the client-side during execution of an example service scenario, in accordance with an embodiment of the present invention.

The collaboration and sequence of events between the Test Framework components on the client-side during the execution of a typical service scenario will now be described with reference to FIGS. 2a-b and 5. FIG. 5 is a diagram describing the collaboration and sequence of events between test framework components on the client-side during execution of an example service scenario, in accordance with an embodiment of the present invention. This demonstrates how breakpoints are defined and processed, and how test results are returned by the framework.

The Run Tool 205 invokes the Test Container Run Handler 215 createTest function passing the input parameters and environment of the scenario. In one particular embodiment, the Test Container 251 is configured and launched manually. Alternatively, the Run Handler 215 configures and launches the Test Container 251. The createTest function returns a Test Object 210 to the Run Tool 205. The Run Tool 205 accesses the Event Request Manager of the Test Object 210. In the example embodiment shown in FIG. 5, this accessing by the Run Tool 205 includes: creating a Send Message Request populated with an Input Message to send and targeted for the entry endpoint of the Run Service; creating a Breakpoint Request targeted for the Test Interceptor Service 255 and set to suspend the execution of the Test; and creating a Receive Message Request targeted receiving messages from the exit endpoint of the Test Interceptor Service 255. The Run Tool 205 then invokes the Test Object 210 start function, and begins consuming events from the Event Queue of the Test Object 210. Continuing with the example of FIG. 5, the Run Tool 205 consumes and ignores a Send Message Event (not shown in diagram). The Run Tool 205 processes a Breakpoint Event enabling the application to examine and modify the runtime application state of the SIT 260, and then resumes execution of scenario by calling resume on the event. The Run Tool 205 processes a Receive Message Event and extracts the result message from the event data. The Run Tool 205 closes the Test Object 210 when the scenario completes.

The internal processing performed by the client-side Test Framework to configure and launch the Test Container 251 for the execution of a scenario, in accordance with one embodiment of the present invention, will now be discussed. In more detail, the Run Tool 205 passes the service configuration of the SIT 260 to the Test Container Run Handler 215. The Run Handler 215 creates or updates the configuration of the SIT 260 in a Directory Service, and adds the SIT 260 to the Test Container's 251 configuration. The Run Handler 215 creates an instance of the Test Interceptor Service 255 and associates it with the SIT 260. The Run Handler 215 adds the configuration for the TIS 255 to the Directory Service. With respect to launching the Test Container 251, the Run Tool 205 passes the environment parameters for launching the Test Container 251 to the Run Handler 215. The Run Handler 215 launches the Test Container 251 containing the newly configured SIT 260. The Run Handler 215 can also shut down the Test Container 251 if desired. Alternatively, the user can manually manage the lifecycle of the Test Container 251. The configuration of the TIS 255 may be, for example, done at installation time.

The Directory Service is a central repository for configuration information. The Directory Service can also be a centralized storage location for other files. Various alternative embodiments are enabled via the Directory Service. For example, in one such embodiment, the configuration for the SIT 260 is pre-existing in the Directory Service. Here, the TCRH 215 makes no updates to the Directory Service, and the TIS 255 is automatically enabled when the Test Container 251 is started with a debugging flag enabled and is available for all service. The TCRH 215 is not responsible for setting this up.

Note that to run a scenario, the TIS 255 for the service to be tested (SIT 260) is deployed to the Test Container 251. As previously explained, an interceptor service includes a mechanism in the ESB to allow messages to and from an ESB service to be intercepted. This interceptor interacts with the Test Context (also referred to as the "Run Context" herein) and uses the API on the Test Context to communicate with the Test Object 210 (also referred to as the "Debug Context" herein). This pattern of message interception can be implemented as done in many other systems, such as J2EE (servlet filters), or in any number of Simple Object Access Protocol (SOAP) stack implementations (handler chains). However, other mechanisms to interact with the Test Context and expose its state and location to the Test Object 210 may be used, such as a servlet filter, a message handler, an Aspect (AspectJ), code in the SIT 260, or any other mechanism.

Further note that a Test Container is any container with services capable of interacting with the Test Context. For instance, and in accordance with one embodiment, all Services are able to interact with the Test Context if a flag is turned on in the Test Container. In this sense, a Service Type is not deployed per se; rather, it is a configuration construct that is accessible in any container. In one particular implementation, a flag is set to allow interaction with the Test Context (for security reasons). However, this may also be implemented by having this flag set to True. In such a case, the concept of the "Test Container" essentially goes away. A Service Type includes information like the class to utilize for service instances, and available configuration parameters. A Service Instance includes information like values for available configuration parameters. Many Service Instances can exist for a single service type. Service Instances are deployed, and in some cases this deployment is done manually. This can be done outside of the run/debug framework. However, they can be deployed to any container. Utilizing the patterns described herein, the Service Instances can be deployed to any container world-wide. Service Instances can also be moved to other containers dynamically. In all cases, the Test Object (Debug Context) sees the same view of the artifacts under test and the locations of Service Instances are completely transparent to the Debug Context.

Further note that the Service Instances under Test need to be running in order to execute a scenario. In accordance with one embodiment, a service is deployed into a Test Container, and that container needs to be running in order to run a service. In one such particular implementation, that container also has to be configured to interact with the Test Context (Run Context).

Also note that another particular embodiment of the present invention supports dynamic deployment of Service Instances, where new Service Instances can be added to a running container. In such cases, the container needs to be restarted in order for that service to be started. In one such embodiment, a message with a Test Context attached can be sent to a service that is not running. The result would be the "Run" instance remaining active waiting for the Test Context to be serviced. This is unlike most other remote debugging technologies that require the SIT to be running so the debugger can attach to it.

Further note that a Test Container for the Service Instance to be tested can be manually launched. This is handled outside of the Test Framework. In addition, if the Test Container is not running, the overall run can still be started; it would just pause until the Test Container is correctly started. For instance, in an embodiment using Java Messaging Service (JMS) as an underlying transport, the message will simply remain queued until it is serviced. Also, another particular embodiment enforces unique step names for every step in a process.

The internal processing performed by the client-side of the Test Framework to handle Messages sent and received from the Test Container 251 will now be discussed. In particular, this section demonstrates how the Run Tool 205 in conjunction with the Test Container Run Handler 215 sends and receives messages from the Test Container 251. Test clients such as the Run Tool 205 send messages to the Test Container 251 by populating them into Send Message Requests. The Test Object 210 processes the Send Message Request by creating a Test Context Part in the Test Message 220 and populating it with the Test Context Object associated with the Test Object 210. The Test Object 210 then sends the Test Message 220 to the destination indicated in the request. Test clients such as the Run Tool 205 receive messages from the Test Container 251 by submitting Receive Message Requests to the Event Request Manager of a Test Object 210 and consuming Receive Message Events containing received messages from the Event Queue of the Test Object 210. The Test Object 210 processes the Receive Message Request by creating a message listener on the destination indicated by the request. The message listener associated with a Receive Message Request receives an Output Message from the destination and creates a Received Message Event containing the message and adds it to the Event Queue of the Test Object 210.

Server-Side Execution of Test Scenario

Figure 6:
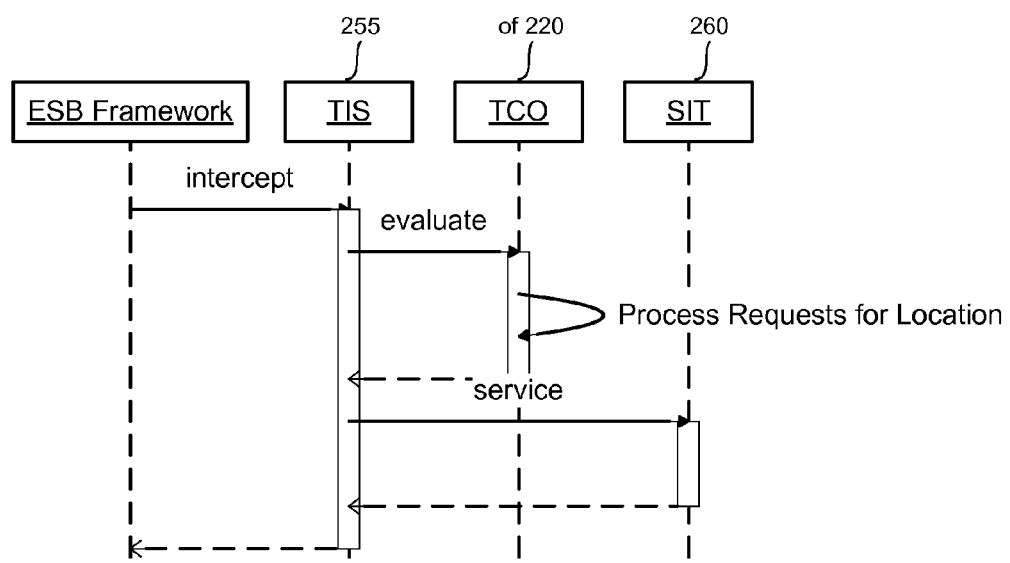
FIG. 6 is a diagram describing the collaboration and sequence of events between test framework components on the server-side during execution of an example service scenario, in accordance with an embodiment of the present invention.

The operations performed by the Test Interceptor Service 255 (in conjunction with the Test Context Object) initiates processing of Event Requests in the Test Container 251 at the entry point of a service or business process will now be discussed with reference to FIGS. 2a-b and 6. FIG. 6 is a diagram describing the collaboration and sequence of events between test framework components on the server-side during execution of an example service scenario (and in particular, the service location processing in the Test Container 251), in accordance with an embodiment of the present invention.

As can be seen with reference to FIG. 6, when the entry endpoint of the SIT 260 receives the Test Message 220, the intercept function of the Test Interceptor Service 255 is invoked by the ESB Framework (and in particular, by components of the Test Client 201). The Test Interceptor Service 255 examines the first Message 220 in the inbox for a part containing a Test Context Object. If found, the Test Interceptor Service 255 extracts the Test Context Object and invokes the process function of the Test Context Object passing in its Service Location (or its Process Location if in a Process Step) and Service Context. When this invocation returns, the Test Interceptor Service 255 invokes the service function of the SIT 260. The Test Interceptor Service 255 intercept function then returns.

The internal processing performed by a Test Context Object (of Test Message 220) at a specific test location, in accordance with one embodiment of the invention, will now be discussed. In particular, this section demonstrates how requests targeted at specific test locations in the Test Container 251 are processed by the Test Framework. In more detail, and in accordance with one particular embodiment of the present invention, when the process function of a Test Context Object is invoked, the Test Context Object extracts a list of Event Requests, maintained in the Test Object, 210 associated with the location it was passed from the Event Request Manager of its Test Object 210. In one particular embodiment, this extraction of a list of Event Requests occurs using an RPC mechanism. The Test Context Object then iterates in order over this list of Event Requests as follows: if an Event Request is not enabled, the Test Context Object continues iterating over the list; otherwise, the process function of the Event Request is invoked and the data object that was passed to the Test Context Object is passed to the function.

The internal processing performed by the process function of a Service Breakpoint Request will now be discussed. In particular, this section demonstrates the communication and synchronization that can occur between the Test Client 201 and the Test Container 251 when processing a request. In more detail, and in accordance with one particular embodiment of the present invention, when the process function of the Service Breakpoint Request is invoked, the request validates that the data object passed in is a Service Context and returns if not. The request then creates a remote proxy to the Service Context. In addition, the request creates a Service Breakpoint Event with the remote proxy of the Service Context populated as its data object. The event is added to the Event Queue of the Test Object 210. If the suspend property of the request is set to True, the request suspends execution of its thread until the Test Client 201 invokes resume on the Service Breakpoint Event. The Test Client 201 consumes the Service Breakpoint Event, extracts the Service Context Proxy object and notifies the application of the event passing along the proxy. When the application indicates to resume execution of the Scenario, the Test Client 201 invokes resume on the Service Break Event. The process function then returns.

In one particular embodiment of the present invention, every location in the Test Framework is uniquely identifiable in order for the Test Client 201 to indicate where the application state is located in relation to the overall business process. In one such embodiment, the location in a business process is indicated by the process name and the step name.

Example Lifecycle of a "Run"

Figure 7:
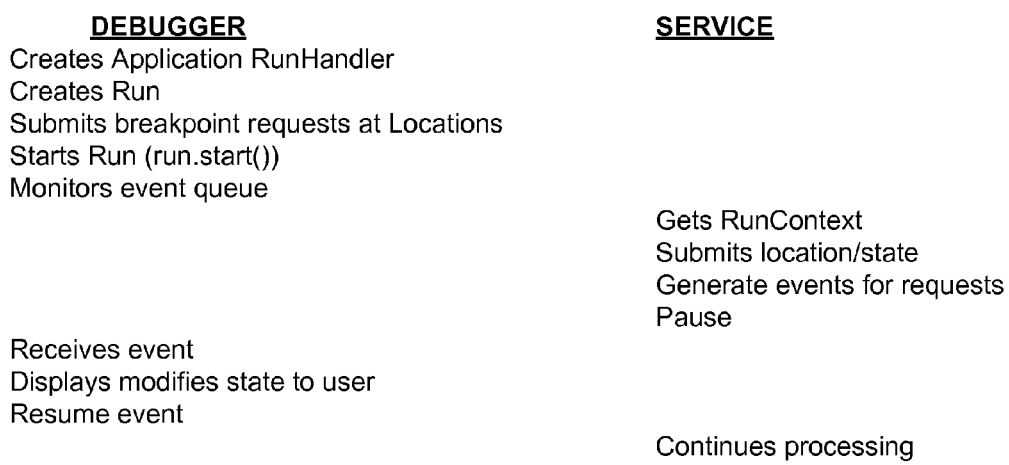
FIG. 7 illustrates how a debugger/service interacts in a lifecycle, in accordance with one embodiment of the present invention.

As previously explained, the Test Framework defines an asynchronous API to interact with the applications being debugged. FIG. 7 illustrates how a debugger/service interacts in a lifecycle, in accordance with one embodiment of the present invention.

The Test Framework is extensible in that new artifacts can be added with relative ease. In one example embodiment, the following artifacts have individual run handlers: Progress® Sonic ESB® Processes/Services, ESBWS, ESBDB, Transformation Service (XSLT), Orchestration Service Business Processes, and XML Server XActions. For example, and in accordance with one particular embodiment, the Test Framework supports the following in regard to Progress® Sonic ESB® Processes: breakpoints before/after every step that represents an ESB Service, ESBWS, or ESBDB invocation;

breakpoints before/after a call to a sub-process; and single-stepping. In addition, the Test Framework supports the following in regard to ESB Services: breakpoints before/after the call to the service( ) function; and single stepping. In accordance with another particular embodiment, the Test Framework supports the following in regard to Progress® Sonic ESB® ESBWS/DB calls: breakpoint at the "INPUTS" location (after variable->parameter mapping); breakpoint at the "OUTPUTS" location (after the web service/SQL invocation, shows the output parameters); and breakpoint at the "Everything" location (after the parameter->variable mapping). In accordance with another particular embodiment, the Test Framework provides the ability to perform a transformation and get one or more outputs, so as to support Transformation service. In accordance with another particular embodiment, the Test Framework supports with respect to XML Server: execution of generic XAction lists (e.g., by URL or "inline" in a property) against a given input message; execution of XSLT stylesheets where the target document is supplied in a property (i.e., not by URL); and execution of XQuery operations where the target document is supplied in a property (i.e., not by URL). Other artifacts will be apparent in light of this disclosure.

Sending/Receiving Messages

Most SOA and ESB implementations have the concept of a "message" that is used for inter-component communication. In operation, and in accordance with one particular embodiment of the present invention, the start of a test typically requires the sending of a message to start a test (with the notable exception of ESBWS/ESBDB e.g. Progress® Sonic ESB®). The Test Framework allows the debugger to submit "Run" messages. The Test Framework also allows debuggers to request interest in messages sent to the Response, Fault, and RME endpoints. The Test Framework abstracts the Entry/Exit/Fault and RME ESB endpoints from the debugger. The debugger submits a request that it is interested in Exit, Fault, and RME messages. The Test Framework handles the endpoints internally. With the exception of ESBWS/ESBDB, all current Run Handlers 215 of this example embodiment require the creation of a message to start a test. A utility function createMessage( ) (e.g., within ESB Run Utility XQ Message Factory by Progress® Sonic ESB®) can be employed to create a message in the debugger. The debugger then can manipulate the message to match the correct input into the artifact being tested. In one such embodiment, the debugger submits a "SendRunMessageRequest" to the Event Request Manager. If the debugger is interested in receiving response, fault, and RME messages, then the debugger submits a ReceiveResponseMessageRequest, ReceiveFaultMessageRequest, and ReceiveRMEMessageRequest respectively. A Run can be started, for example, by calling Run.start( ). This causes the SendRunMessageRequest to send the message that will run the appropriate artifact. When a message is received as a result of a response, fault, or RME message, an event is generated. Table 1 illustrates example requests and corresponding events, in accordance with one particular embodiment of the present invention:

TABLE 2

| ReceiveResponseMessageRequest | ReceiveResponseMessageEvent |
| ReceiveRMEMessageRequest | ReceiveRMEMessageEvent |
| ReceiveFaultMessageRequest | ReceiveFaultMessageEvent |

All the above events have a message called "getMessage( )" which will return the message sent or received. Note that getData( ) on the above events will return NULL. Further note that all locations associated with the send/receiving messages will be located at the "RunStartLocation". In one particular embodiment, sending messages and handling responses includes the following steps: (1) Create RunHandler; (2) Initialize Run handler with connection parameters; (3) Create the Test Object (also referred to as a "Run" or "Run Object" herein); (4) Retrieve Event Request Manager from the Test Object; (5) Register interest in response messages; (6) Create initial message; (7) Start the test; (8) Monitor the Event Queue, handle resulting events; and (9) Resume events.

Breakpoints

A powerful feature of the Test Framework is the capability to set breakpoints on an artifact. The setting of a breakpoint can occur before or during the running of an artifact, such that the breakpoint is honored. Breakpoints will trigger, regardless of the distributed nature of that artifact. A breakpoint request can be submitted to the Event Request Manager with a given location. If the artifact reaches the given location, a BreakpointEvent is generated. The location from the Event is a location that satisfies the location given to the Event Request Manager. In one particular embodiment, a BreakpointEvent includes the following functions of interest: Event.getData( ) and Event.getRemoteRunContext( ). The Event.getData( ) function returns the data exported from the service or distributed application. This may return null if the service or distributed application did not send back any information (e.g., use the location to determine the data type). The Event.getRemoteRunContext( ) function returns a RemoteRunContext. The RemoteRunContext includes some state of interest to debuggers. It exposes two pieces of information: the TrackingID and the Stack. The TrackingID is a string that is kept with the RunContext as it flows between applications. This string has no impact on the Test Framework, but rather is useful for debuggers. A debugger can retrieve and set this value on any Breakpoint event. The value of this string will be propagated and copied as RunContexts are propagated and copied. This is useful to allow debuggers to keep their own state and support higher-levels of event correlation (e.g., see discussion on MultiThreading/Branches with reference to FIG. 8). The Stack is a simple stack of Locations (supported by the Run Context) that is pushed/popped as the RunContext flows from parent processes into services/sub-processes. The stack is also utilized in the process of single-stepping, as will be explained in turn.

Single Stepping

As previously explained, the Test Framework natively supports the capability to single-step artifacts. In accordance with one embodiment of the present invention, there are three types of Step requests that can be utilized, as noted in Table 3:

TABLE 3

| Request | Event |
| --- | --- |
| StepNextRequest | StepEvent |
| StepIntoRequest | StepEvent |
| StepOutRequest | StepEvent |

In particular embodiment, single stepping is closely tied to the stack that is available within a Run Context. The depth of the stack controls the proper behavior of StepNext and StepOut. If an artifact supports the stack, the artifact is capable of being single-stepped. The debugger performs a single-step by submitting a step request with a location. The location serves as a capability to control what locations qualify to trigger the next step event. This allows advanced stepping behavior such as "Step to next Before location", or "Step to next After Location". However, typically, it is expected that single-stepping will utilize the "Any" location. The Any location can be created, for example, from the ESB Run Any Location Factory (e.g., by Progress® Sonic ESB®). An AnyLocation will match any location that is being debugged. The Any location allows seamless stepping between different types of artifacts without the debugger being necessarily informed on the type of artifacts being debugged. For instance, a StepintoRequest for the AnyLocation will allow the Test Framework to step into any artifact that is capable of being debugged through the Test Framework. A StepintoRequest, for instance, can be utilized to step from a business process to another artifact without the debugger knowing what artifact is being stepped into. In addition to a location, a StepRequest requires a "RemoteRunContext" from the last breakpoint/step request that was previously honored by the debugger. This RemoteRunContext includes state information used for single-stepping to function (especially in multi-branch environments). The resulting StepEvent(s) are a subclass of BreakpointEvent and contain its capabilities. Typically, a step request will result in a single StepEvent. A step request only performs a single step, and a single step event. Additional stepping requires additional step requests. A step request coincides with a single step. However, in situations where a user is single stepping across a fanout in a business process, or if a service outputs multiple messages in a business process (e.g., Progress® Sonic ESB® itineraries), multiple step events can occur from a single step request. This is because a single-step results in multiple simultaneous steps to occur. In a particular embodiment, that submitting multiple step requests without ever removing them will cause step requests to accumulate on the Event Request Queue.

The Stack

As previously explained, the Test Framework keeps a stack of Location objects. The top of the stack represents the current location in a Run. When the Test Framework steps into another artifact, an additional location is pushed onto the stack for that artifact. This additional location is popped once the sub-artifact is complete. In one particular embodiment, support for the stack controls single-stepping behavior. StepNext will step to a qualifying location whose stack depth is less than or equal to the current stack depth. StepOut will step to a qualifying location whose stack depth is less than the current stack depth. StepInto will step to the next qualify location, regardless of the stack depth. The stack is accessible to the debugger via a RemoteRunContext. The RemoteRunContext is available from any BreakpointEvent and its subclasses.

Suspend/Resume

The Test Framework also supports the suspension and resumption of a running artifact. In one particular embodiment, this is accomplished via the suspend( ) and resume( ) function calls on the Test Object 210. Calling run.suspend( ) causes a SuspendEvent to be generated every time an artifact reaches a Location. This suspend event can be resumed via Event.resume( ). However, resuming a SuspendEvent will result in another suspend event at the next applicable location in the artifacts being tested. SuspendEvents will only cease if Run.resume( ) is subsequently called. All suspend events received before Run.resume( ) still need to be individually resumed.

Custom Events

Up until now, all the events described in the Test Framework have been provided by the framework, and its constituent Run Handlers. In accordance with another embodiment, the Test Framework also provides a mechanism for applications to spontaneously generate events for debuggers using a "Custom" Event. A CustomEvent is an interface that represents a subset of implementation required to create and event in the Test Framework. Implementers and users of CustomEvent can: implement the CustomEvent interface and related objects; retrieve the Run Context; and send the event. The event has the capability of sending information to the debugger. In one such embodiment, the only requirement for this information is that it implement the ESB RunRemoteValue interface (e.g., by Progress® Sonic ESB®) and java.io.Serializable. However, the value can also be an "Exported" value capable of making RPC calls to the service being debugged. Making these exported objects implement a pattern like JavaBeans can allow debuggers to display any exported information. To send a CustomEvent, an application must first retrieve a RunContext. A RunContext is retrievable from the message that was sent utilizing a SendRunMessageRequest, or initiated by message utilizing a SendRunMessageRequest. This function will return a Run Context if one is associated with the message. A Run Context will be associated with a message if: deployment parameter TEST_CONTAINER_MODE is True on the ESB Container, and the message originated or was a result of a message sent by a SendRunMessageRequest. In this particular case, in order to utilize run/debug in a container, the ESB Component must have the deployment parameter TEST_CONTAINER_MODE set to True because, when TEST_CONTAINER_MODE is True, it is possible for external clients to inject code into ESB (which is what debuggers will essentially do). This can be a security hole in deployment environments. Setting this value to True activates the utilization of this injected code for development deployments. On the Run Context, there is a function "send (CustomEvent)". CustomEvent can be submitted to the Test Framework (also may be referred to as debug framework or run/debug framework) using this send( ) function. The send (CustomEvent) function will block until the debugger calls Event.resume( ) on the resulting generated event.

Using Exporters

The Test Framework provides an advanced capability of allowing a debugger to modify/manipulate state in a service being debugged. In one embodiment, this capability utilizes Java Dynamic Proxies to allow applications to "export" objects. Exported objects are essentially dynamically created RMI stubs. These stubs can be sent via an event to a debugger. The debugger can then utilize the stub to directly manipulate the data exposed by the exported object using RPC. In one particular case, Objects to be exported follow the following rules: must implement an interface that implements ESB Run RemoteValue (e.g., by Progress® Sonic ESB®); all functions in this interface throw a java.rmi.RemoteException; and this interface must implement java.io.Serializable. For instance, taking the examples previously discussed with reference to Custom Events, MyExposedInformation simply serialized information to the debugger. However, if instead, MyExposedInformation implemented with the following example interface (which employs Progress® Sonic ESB® technology):

```
import java.rmi.RemoteException;
import com.sonicsw.esb.run.RemoteValue;
public interface ExposedInformation extends
    RemoteValue, Serializable
{
    public void setInformation(String info) throws RemoteException;
    public String getInformation( ) throws RemoteException;
}
``` and MyExposedInformation is implemented with this interface:

```
class MyExposedInformation implements ExposedInformation
{
    private static final long serialVersionUID=6569457420050982605L;
    private String m_info;
    private Location m_location;
    public MyExposedInformation(Location location)
    {
        m_location=location;
    }
    public void setInformation(String info) throws RemoteException
    {
        m_info=info;
    }
    public String getInformation( ) throws RemoteException
    {
        return m_info;
    }
    public Location getLocation( ) throws RemoteException
    {
        return m_location;
    }
}
``` then MyExposedInfomation is capable of being "exported".

Progress® Sonic ESB® provides preconfigured exporters that can be utilized when a message is received with a Run Context. Messages with Run Context also have an associated UUID. This UUID can be utilized to retrieve an Exporter that is associated with a particular run/debug session. In one example embodiment, this UUID is retrievable using the utility function com.sonicsw.esb.run.util.XQMessageUtil.getUUIDFromMessage( ) (e.g., by Progress® Sonic ESB®). Similar to the RunContext, the UUID is available if:
 1) TEST_CONTAINER_MODE is True on the ESB Container; and
 2) The message originated or was a result of a message sent by an SendRunMessageRequest The result of the exporter.export( ) call will be an object that implements ExposedInfomation. This returned object is not the original object, but a stub. Calls on this stub result in RPC calls to the MyExposedInformation object. This stub is then propagated to the debugger via the event. The debugger (e.g., which could be anywhere in the JMS Domain) can then use this setup to manipulate the state of MyExposedInformation using the setInformation( ) function. This, of course, is a single utilization of these capabilities. As long as an Object that follows the rules discussed above, information of arbitrary complexity can be exposed to the debugger. Note that the RunContext.send(CustomEvent) will block until the debugger resumes the event. Once the send function returned, the application should unexport the exported object using the Exporter.unexport( ) function. Further note that an exporter can only export a single object. If multiple objects are exported during a single call to the XQService.service( ) function, call ESBPreferredEndpointTracker.getInstance( ).getExporter(uuid) to retrieve a new exporter (e.g., by Progress® Sonic ESB®). Alternatively, "Exporter" capabilities are also available in open frameworks, such as JINI Extensible RMI (JERI). Alternatively, standard RPC mechanisms can be utilized, such as Java RMI.

Run/Debug Communications

The Test Framework is implemented using Java Dynamic Proxies, in accordance with one particular embodiment. To utilize the debug framework, the communications layer can be configured. When utilizing the Run Framework outside of an ESB container, the following example code (e.g., by Progress® Sonic ESB®) can be run to initialize the debug communications layer:

```
//Initialize the communications framework
HashMap map=new HashMap( )
map.put(DebugCommunicationFactory.CLIENT_COMMUNICATOR CLASS_PROP, "com.sonicsw.esb.jeri.jms.JMSClientCommunicator");
map.put(com.sonicsw.esb.jeri.jms.Constants.REPLY_DESTINATION_TYPE, "QUEUE");
map.put(Constants.PING_REQUEST_TIMEOUT, "10000");
DebugCommunicationFactory.init(map);
```

The "DebugCommunicationFactory" in this example embodiment is a static configuration object that is utilized by the Test Framework to use the proper communications layer. The "com.sonicsw.esb.jeri.jms.JMSClientCommunicator" (e.g., by Progress® Sonic ESB®) initializes the communications layer to utilize JMS. There are some other properties that are applicable with the JMSClientCommunicator in use: PING_REQUEST_TIMEOUT (When an RPC call takes a long time to execute, a ping message is sent between the debugger and the application being debugged. This is amount of time to wait for a ping response. If the ping times out, then a timeout exception will occur from the RPC call); REPLY_DESTINATION_TYPE (When an RPC request is made over JMS, this controls if the reply destination should be a topic or a queue. This defaults to "QUEUE", and a queue is recommended. If the response destination is a queue, then the application will receive a client disconnected exception if the debugger exits.

MultiThreading/Branches

Figure 8:
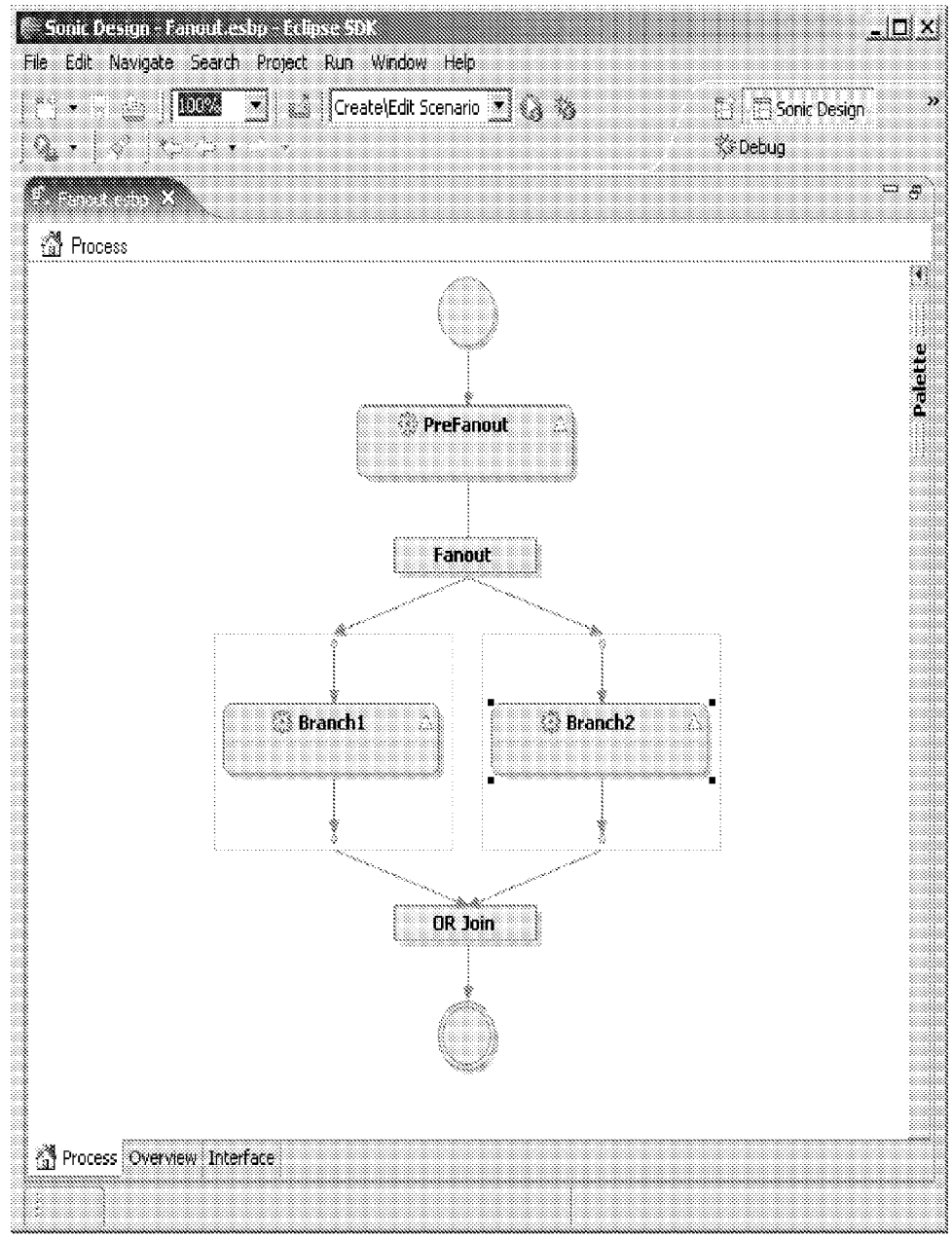
FIG. 8 illustrates an example distributed business process.

In the example distributed business process shown in FIG. 8, there is a service PreFanout that exists before a fanout step. The fanout fans-out to two services, Branch1 and Branch2. If a user single-steps from "PreFanout", then a single-step from PreFanout will result in two StepEvents. One StepEvent for Branch1, another StepEvent for Branch2. When these events occur is dependent on the backend configuration (e.g., Progress® Sonic ESB®, if intracontainer is on, then the fanout will single-step depth first, if intracontainer is off, then the behavior should be random). Subsequent single-steps from Branch1 or Branch2 continue stepping on the particular branch from which the previous single-step came from (e.g., using information contained in the previous step's RemoteRunContext). The Test Framework tracks the appropriate context information such that users can continue to single-step on the branch of interest, while other branches are unaffected. However, in situations where multiple simultaneous branches are being debugged, debuggers may require a higher level of coordination to tell which branch an event is associated with. To assist debuggers with that task, a TrackingID can be stored with the Run Context, as previously discussed. The TrackingID can be utilized by debuggers to associate their own state information with a Run Context. This state information can then be read from BreakpointEvents to associate an event with a branch. One possible use of the TrackingID (e.g., as used by the Progress® Sonic Workbench™ Eclipse Debugger, which is a tool that can be used to analyze a program while it is running) is to store a String representation in the TrackingID "Thread Name:Counter". In one particular embodiment, the algorithm is as follows:
 1) For every branch encountered during a debug session, store it in a table consisting of "ThreadName", "Counter".

2) If a BreakpointEvent is retrieved without a TrackingID set, create a new entry in the table "THREAD_1" with a counter value of 0. Set "THREAD_1:0" as the TrackingID of the Run Context.
3) If a BreakpointEvent is retrieved with a TrackingID set, compare the tracking ID with the values in the table. If the THREAD ID is already in the table, and the counter in the TrackingID is equal to our current TrackingID counter, update the counter in the table, and the counter in the TrackingID by 1. So if this was the first breakpoint event after #2 above, set the TrackingID to "THREAD_1:1".
4) If a BreakpointEvent is retrieved with the TrackingID set, and the counter is less than the value stored in the table, then a new branch has been created. Update the TrackingID in the Run Context to a unique thread name with a counter of 0. Update the table to include this new thread name with a counter of 0.

So, in the example above and with reference to FIG. 8, the following would occur:

1) A BreakpointEvent triggers at PreFanout.
2) The TrackingID is retrieved from the Remote Run Context
3) The TrackingID is null, set the TrackingID to "THREAD_1:0".
4) Add the TrackingID to the debugger's table, "THREAD_1" "0".
5) Perform a step request.
6) A StepEvent occurs at Branch1 (or Branch2 depending on timing and configuration).
7) The TrackingID is retrieved from the Remote Run Context.
8) The TrackingID is not null and is equal to "THREAD_1:0".
9) Compare with the debuggers table, "THREAD_1" exists. The counter is equal to the table's counter.
10) Increase the counter in the table by 1. Update the TrackingID to "THREAD_1:1".
11) A StepEvent occurs at Branch2.
12) The TrackingID is retrieved from the Remote Run Context.
13) The TrackingID at Branch2 will be "THREAD_1:0" (the value set at step #3 above).
14) The thread ID exists, the counter is less than our current counter value (0).
15) This must be a new branch, set the TrackingID to "THREAD_2:0".
16) Add the TrackingID to the debugger's table "THREAD_2" "0".

This algorithm would allow a debugger to detect when multiple branches of execution occur. However, the TrackingID is opaque to the Test Framework and can be utilized to store any string with the Run Context.

Implementation Details

As will be appreciated in light of this disclosure, the Test Framework has the capability to run/debug business processes, services, and many other heterogeneous applications. In one current embodiment, the test framework accommodates the execution of XSLT stylesheets in a Transformation Service, and various flavors of the XML activities against an XML-based database. Details of example implementations are further discussed in the previously incorporated U.S. Provisional Application No. 60/773,576.

In addition, the Test Framework can be used by various ESB tools to run/debug artifacts. For example, using the Test Framework, the following capabilities can be provisioned, in accordance with one particular embodiment: a command line debugger, a profiler, and a thread-analyzer. A command line debugger, such as the GNU Project debugger (GDB) or similar debuggers typically found on UNIX platforms, could be utilized to debug deployments without the complete Progress® Sonic toolkit. With a profiler, and a thread-analyzer, can be used in conjunction with the Test Framework disclosed herein, to implement a comprehensive toolset that can perform analysis on the configurations and the behavior of any supported artifact. Similar to other utilities, it is now possible for utilities to be written that detect deadlocks, hangs, or performance issues on a runtime.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for debugging distributed applications for a given scenario, comprising:
    exposing, by a Run Context, state of at least one of a distributed application and services making-up that distributed application, the Run Context including an Application Programming Interface (API) that allows the services to interact during debug;
    coordinating, by a Debug Context, the distributed application and presenting a unified view of the distributed application to a debugger, wherein the Debug Context includes a centralized repository; and
    triggering, by the Run Context as the Run Context flows with the distributed application, a callback into the Debug Context, thereby modifying state of the Debug Context;
    wherein the distributed application utilizes the Run Context to interact with the Debug Context and wherein the callback includes at least one of distributed application state and service state and the at least one of distributed application state and service state is modified by the debugger using the Debug Context before a response is sent from the debugger.

2. The method of claim 1 wherein the Run Context can be copied and destroyed during execution of the distributed application, thereby allowing the Run Context to propagate wherever the distributed application resides, regardless of how and when the distributed application decides to distribute itself.

3. The method of claim 1 wherein the Run Context further includes knowledge on how to contact the debugger.

4. The method of claim 1 wherein when the Run Context triggers a callback, the method further comprises:
    waiting, by the Run Context, for a response from the debugger utilizing the Debug Context.

5. The method of claim 4 wherein while waiting for a response, the Run Context blocks at least part of the distributed application until the debugger allows that at least part of the distributed application to resume.

6. The method of claim 1 wherein the debugger can modify at least one of distributed application state and service state dynamically during debug.

7. The method of claim 1 further comprising:
    executing one or more debugging capabilities, including at least one of providing breakpoints, suspending/resuming, single-stepping across heterogeneous service environments, and modifying distributed application and/or service state dynamically while debugging.

8. The method of claim 1 wherein the Run Context is associated with a stack of locations, the method further comprising:
   accessing the stack to carry out a single-stepping process.

9. The method of claim 1 wherein the Run Context is associated with a tracking ID that allows the debugger to detect when multiple branches of execution occur.

10. A computer program product, residing on one or more non-transitory machine-readable storage mediums encoded with distributed applications for a given scenario, the process comprising:
   exposing, by a Run Context, state of at least one of a distributed application and services making-up that distributed application, the Run Context including an Application Programming Interface (API) that allows the services to interact during debug;
   coordinating, by a Debug Context, the distributed application and presenting a unified view of the distributed application to a debugger, wherein the Debug Context includes a centralized repository; and
   triggering, by the Run Context as the Run Context flows with the distributed application, a callback into the Debug Context, thereby modifying state of the Debug Context;
   wherein the distributed application utilizes the Run Context to interact with the Debug Context and wherein the callback includes at least one of distributed application state and service state and the at least one of distributed application state and service state is modified by the debugger using the Debug Context before a response is sent from the debugger.

11. The computer program product of claim 10 wherein the Run Context can be copied and destroyed during execution of the distributed application, thereby allowing the Run Context to propagate wherever the distributed application resides, regardless of how and when the distributed application decides to distribute itself.

12. The computer program product of claim 10 wherein the Run Context further includes knowledge on how to contact the debugger.

13. The computer program product of claim 10 wherein when the Run Context triggers a callback, the process further comprises:
   waiting, by the Run Context, for a response from the debugger utilizing the Debug Context.

14. The computer program product of claim 13 wherein while waiting for a response, the Run Context blocks at least part of the distributed application until the debugger allows that at least part of the distributed application to resume.

15. The computer program product of claim 10 wherein the debugger can modify at least one of distributed application state and service state dynamically during debug.

16. The computer program product of claim 10, the process further comprising:
   executing one or more debugging capabilities, including at least one of providing breakpoints, suspending/resuming, single-stepping across heterogeneous service environments, and
   modifying distributed application and/or service state dynamically while debugging.

17. The computer program product of claim 10 wherein the Run Context is associated with a stack of locations, the process further comprising:
   accessing the stack to carryout a single-stepping process.

18. The computer program product of claim 10 wherein the Run Context is associated with a tracking ID that allows the debugger to detect when multiple branches of execution occur.

19. A computer system for debugging distributed applications for a given scenario, comprising:
   a processor configured to run:
   a Run Context for exposing state of at least one of a distributed application and services making-up that distributed application, the Run Context including an Application Programming Interface (API) that allows the services to interact during debug;
   a Debug Context for coordinating the distributed application and presenting a unified view of the distributed application to a debugger, wherein the Debug Context includes a centralized repository; and
   the Run Context as the Run Context flows with the distributed application, for triggering a callback into the Debug Context, thereby modifying state of the Debug Context;
   wherein the distributed application utilizes the Run Context to interact with the Debug Context and wherein the callback includes at least one of distributed application state and service state and the at least one of distributed application state and service state is modified by the debugger using the Debug Context before a response is sent from the debugger.

20. The system of claim 19 wherein the Run Context can be copied and destroyed during execution of the distributed application, thereby allowing the Run Context to propagate wherever the distributed application resides, regardless of how and when the distributed application decides to distribute itself.

21. The system of claim 19 wherein when the Run Context triggers a callback, the Run Context is further configured for waiting for a response from the debugger utilizing the Debug Context.

22. The system of claim 21 wherein while waiting for a response, the Run Context blocks at least part of the distributed application until the debugger allows that at least part of the distributed application to resume.

23. The system of claim 19 wherein the debugger can modify at least one of distributed application state and service state dynamically during debug.

24. The system of claim 19 wherein the system executes one or more debugging capabilities, including at least one of providing breakpoints, suspending/resuming, single-stepping across heterogeneous service environments, and modifying application and/or service state dynamically while debugging.

25. The system of claim 19 wherein the Run Context is associated with a stack of locations, and is further configured for accessing the stack to carryout a single-stepping process.

26. The system of claim 19 wherein the Run Context is associated with a tracking ID that allows the debugger to detect when multiple branches of execution occur.

* * * * *